US009477463B2

(12) United States Patent
Resig et al.

(10) Patent No.: US 9,477,463 B2
(45) Date of Patent: Oct. 25, 2016

(54) SYSTEMS AND METHODS FOR CREATING A PROGRAM SPIN-OFF

(71) Applicant: Khan Academy, Inc., Mountain View, CA (US)

(72) Inventors: John Resig, Brooklyn, NY (US); Joel Burget, Mountain View, CA (US)

(73) Assignee: Khan Academy, Inc., Mountain View, CA (US)

( * ) Notice: Subject to any disclaimer, the term of this patent is extended or adjusted under 35 U.S.C. 154(b) by 0 days.

(21) Appl. No.: 14/454,681

(22) Filed: Aug. 7, 2014

(65) Prior Publication Data
US 2015/0082274 A1 Mar. 19, 2015

Related U.S. Application Data

(60) Provisional application No. 61/864,892, filed on Aug. 12, 2013.

(51) Int. Cl.
*G06F 9/44* (2006.01)

(52) U.S. Cl.
CPC .. *G06F 8/71* (2013.01); *G06F 8/34* (2013.01)

(58) Field of Classification Search
CPC .............. G06F 8/30; G06F 8/33; G06F 8/34; G06F 8/71
USPC ................................................. 717/106–113
See application file for complete search history.

(56) References Cited

U.S. PATENT DOCUMENTS 5,675,802 A * 10/1997 Allen et al. ................... 717/103
5,701,472 A * 12/1997 Koerber et al.
5,760,788 A 6/1998 Chainini et al.
6,757,893 B1 * 6/2004 Haikin .......................... 717/170
6,792,595 B1 * 9/2004 Storistenau et al. .......... 717/110
7,448,045 B1 * 11/2008 Lu et al. ........................ 719/315
7,840,956 B2 11/2010 Gough et al.
8,266,594 B2 9/2012 Balasubramanian
8,539,440 B1 * 9/2013 Liang et al. ................... 717/105
8,560,533 B1 * 10/2013 He ..................... G06F 17/30867
707/727
8,954,928 B2 * 2/2015 Clemm et al. ................ 717/122
2002/0116702 A1 * 8/2002 Aptus et al. ................... 717/170
2002/0144256 A1 * 10/2002 Budhiraja et al. ............ 717/174
2003/0005408 A1 * 1/2003 Tumati .......................... 717/110
2005/0278351 A1 * 12/2005 Niyogi ............. G06F 17/30905
2006/0026567 A1 * 2/2006 McVoy et al. ................ 717/120
2006/0112092 A1 * 5/2006 Ziou ................. G06F 17/30274
2007/0074181 A1 * 3/2007 Zhanh et al. .................. 717/136
2007/0162441 A1 * 7/2007 Idicula et al. .................... 707/5
2007/0203803 A1 * 8/2007 Stone et al. .................... 705/26
2008/0059942 A1 * 3/2008 Brown et al. ................. 717/101
2010/0017788 A1 * 1/2010 Bronkhorst et al. .......... 717/125
2011/0169970 A1 * 7/2011 Wesby .................... G06Q 30/02
348/207.11
2012/0162244 A1 * 6/2012 Ma .................... G06F 17/30277
345/594

(Continued)

OTHER PUBLICATIONS

U.S. Appl. No. 61/864,791, filed Aug. 12, 2013, Resig.

*Primary Examiner* — Qing Chen
(74) *Attorney, Agent, or Firm* — Wilson Sonsini Goodrich & Rosati

(57) ABSTRACT

Systems and methods are provided for an online programming community. A user may be able to view pre-existing code, modify the code, and save it as a spin-off program. Spin-offs of programs may be tracked. A social aspect may be provided where users can vote on community programs. Users may also be able to earn points or awards for various coding or programming community activities.

20 Claims, 18 Drawing Sheets

(56) References Cited

U.S. PATENT DOCUMENTS

| | | | |
|---|---|---|---|
| 2012/0210298 A1* | 8/2012 | Hodgins et al. | 717/113 |
| 2012/0324417 A1* | 12/2012 | Somani et al. | 717/101 |
| 2013/0007700 A1 | 1/2013 | Villar et al. | |
| 2013/0326478 A1* | 12/2013 | Clemm et al. | 717/121 |
| 2013/0326480 A1 | 12/2013 | Clemm et al. | |
| 2014/0258968 A1* | 9/2014 | Brown | G06F 17/21 717/103 |
| 2015/0040101 A1* | 2/2015 | Rummler et al. | 717/113 |

\* cited by examiner

Fig. 10

SYSTEMS AND METHODS FOR CREATING A PROGRAM SPIN-OFF

CROSS-REFERENCE

This application claims the benefit of U.S. Provisional Application No. 61/864,892 filed Aug. 12, 2013, which application is incorporated herein by reference in its entirety.

BACKGROUND OF THE INVENTION

Computer programming can be a challenging subject to learn, particularly when programming novices are trying to figure out coding in an isolated environment. Oftentimes, novice programmers may not know where to start, or how to structure a program from scratch. A need exists for improved systems and methods for providing programming communities that may assist individuals with learning how to code.

SUMMARY OF THE INVENTION

An aspect of the invention is directed to a computer implemented method of creating a program spin-off, said method comprising: receiving a selection of an initial computer program having one or more lines of computer code; displaying, on a display of a user device, the one or more lines of computer code in an editable format; receiving, from an input to the user device, an instruction to save the displayed one or more lines of computer code as a spin-off program of the initial computer program; saving the spin-off program in a memory storage unit and associating the initial computer program as a parent of the saved spin-off program in the memory storage unit; and updating records in the memory storage unit associated with the initial computer program to include the saved spin-off program as a child of the initial computer program. In some embodiments, the method may further comprise displaying, on the display of the user device, the one or more lines of code of the initial computer program in the editable format and a visual representation of the spin-off program.

An additional aspect of the invention may be directed to a computer implemented method of displaying a program, said method comprising: displaying, on a display of a user device, one or more lines of computer code of the program in an editable format; and displaying, on the display of the user device, visual representations of one or more spin-off programs of the program.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 10 shows a user interface displaying documentation relating to a program.

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for social programming. Various aspects of the invention described herein may be applied to any of the particular applications set forth below or for any other types educational applications. The invention may be applied as a standalone device, or as part of an integrated online system. It shall be understood that different aspects of the invention can be appreciated individually, collectively, or in combination with each other.

Social programming may include an in-browser coding environment that promotes social engagement with other coders. An individual may be able to program while online. The individual's code may be accessible to one or more other coders. The other coders may be able to view or modify the user's code. The other coders or the individual coder may be able to create spin-offs of the original code. The other coders may be able to vote on code that they like.

An online community may be formed through which coders may create and/or share code. Coders may also be able to communicate with one another with questions or suggestions.

Figure 1:
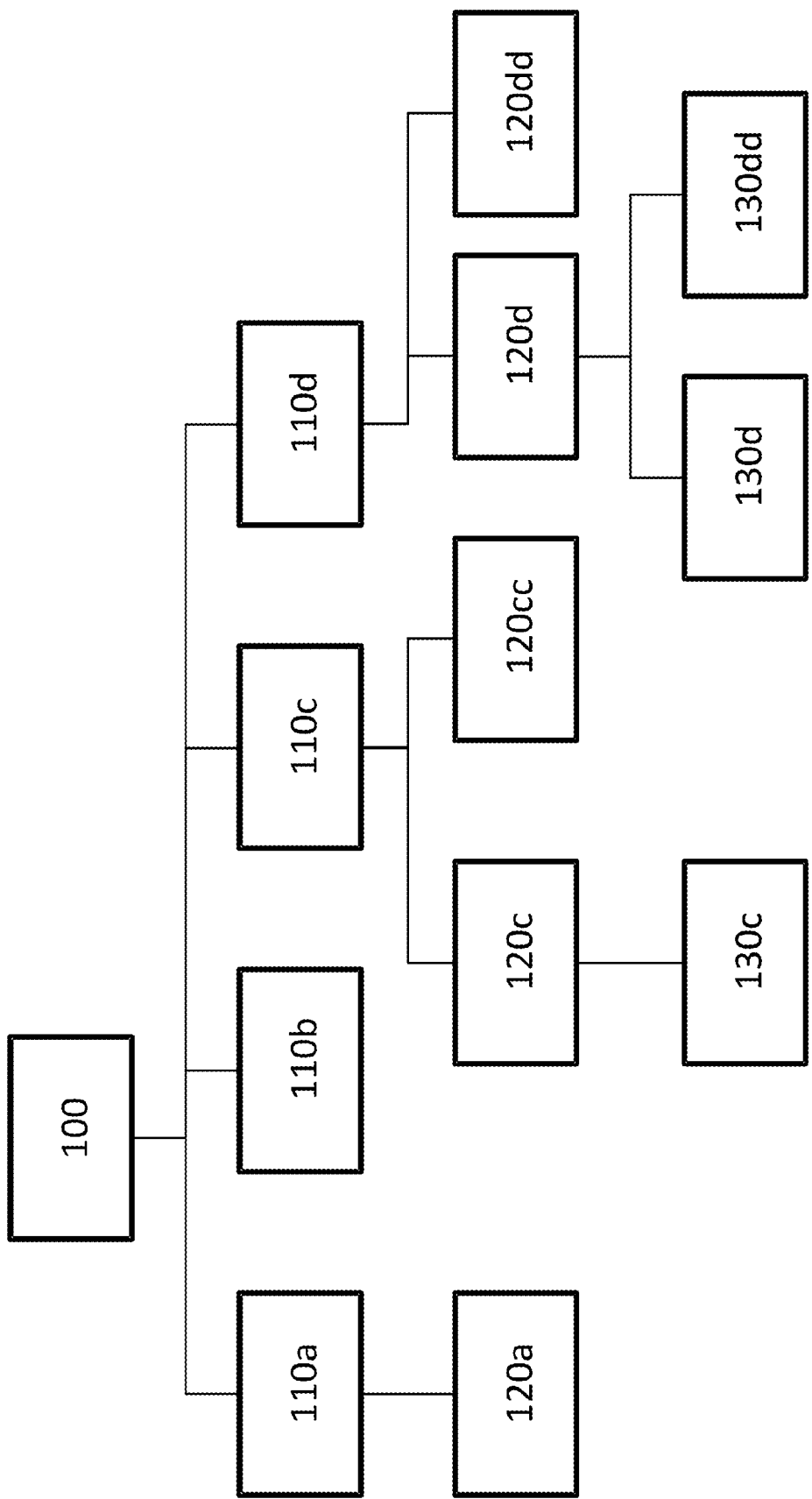
FIG. 1 shows an example of how programs may spinoff from one another in a community, in accordance with an embodiment of the invention.

FIG. 1 shows an example of how programs may spinoff from one another in a community, in accordance with an embodiment of the invention. An original code 100 may be provided. The original code may be created by an individual or multiple individuals. In some instances, a plurality of individuals may collaborate to provide code. Any reference herein to an individual or creator of code may also apply to multiple individuals or creators. In some instances, the original code may be created by a member of the online community. The original code may be created by any member, or may be created by a member with a particular access or status. For example, the original code may be provided by an administrator of the online community, or someone of an educator status in the online community.

The code may be of any programming language known or later developed in the art. The code may be of a language that is used across multiple applications. Alternatively, the code may be specific for the online programming community. Examples of code programming languages may include but are not limited to ALGOL based programming languages, APL based programming languages, BASIC based programming languages, batch languages, C based languages, COBOL based languages, COMIT based languages, DCL based languages, ed based languages, Eiffel based languages, Forth based languages, Fortran based languages, FP based languages, HyperTalk based languages, Java based languages, JOSS based languages, Lisp based languages, ML based languages, PL based languages, Prolog based languages, SASL based languages, SETL based languages, sh based languages, Simula based languages, or Tcl based languages.

In some embodiments, the computer code may include instructions that are readable (e.g., executable) by a computer processor to effect one or more steps or operations. A computer code can yield one or more output, such as a visual and/or audible output. The output may be static (e.g., not changing with time) or dynamic (e.g., changing with time). The output may be responsive to one or more inputs from a user interacting with the output. Alternatively, the output may be provided without requiring any user interaction. Computer code may be stored in memory as non-transitory computer readable media.

The original code 100 may be accessible on an online community. The creator of the code may have created the code while participating in the online community. The online community may be accessible via a browser or application. The creator may directly type the code via a user interface shown on the browser or application. In other embodiments, the creator of the code may have created the code outside the online community and may have copied or imported the code into the online community.

The creator of the code may be able to modify or update the code while in the community. The code may be displayed on a user interface. In some embodiments, an output relating to the code may be displayed on the user interface. In one example, a first region of the user interface may show the code while a second region of the user interface may show the output of the code. The code and the output may be shown simultaneously. The first region showing the code may function as a code editor for the displayed code. When the creator modifies the code, the output may be updated as well. In some instances, the output may be updated in real-time in relation to the update of the code. Alternatively, the output may be updated after the code has been modified and an instruction to compile or execute the code has been provided.

The original code 100 may be viewable and repeatedly accessible to the creator. One or more other individuals may also be able to view the original code. Access to the code may be limited to the creator only, to selected individuals, to all individuals who are a registered part of the online community, or to any individual of the public who accesses the online community. In some instances, the creator of the code may control access to the creator's code. For example, the creator of a code may specify that only selected individuals may view the creator's code. In another example, the creator may specify that any member of the public may view the creator's code. Alternatively, another individual or entity may control access to the creator's code. For example, an administrator may specify that code created in the system will be viewable to all members of the online community. In another example, an educator of the creator of the code may specify that only members of the educator's group (e.g., the educator, the creator (a student), and other students of the same educator) may view the code.

Other individuals may be able to modify the original code 100 and save it as a spin-off 110*a*, 110*b*, 110*c*, 100*d*. In some instances, the creator may modify the creator's own original code and save it as a spin-off. The spin-off code may be associated with the individual that saves the spin-off code. For example, if a creator creates the original code, and another individual saves the spin-off code, the spin-off code may be associated with the other individual. In some embodiments, an individual may create a spin-off when viewing code (e.g., whether the individual is the creator of the code that is viewed or not). An individual viewing code may select an option to save the viewed code as a spin-off. The individual viewing the code may or may not have modified the code prior to saving it as a spin-off. The individual may start or continue to modify the code after having saved it as a spin-off.

In some embodiments, the spin-offs need not be modified significantly or at all from the original code. In some instances, the spin-offs may undergo a large amount of modification from the original code. In some instances, the original code may provide a starting point for the spin-offs. A user may be viewing the original code when starting the spin-off.

Further spin-off programs 120*c*, 120*cc*, 120*d*, 120*dd* may be created from spin-off code 110*c*, 110*d*. Additionally spin-offs 130*c*, 130*d*, 130*dd* of further-spinoffs may be created. Any number of spin-offs may be created. Similarly, any number of generations of spin-offs may be created. In some embodiments, a program 110c may have a parent program 100 from which it spun-off. The program may have one or more sibling programs 110a, 110b, 110d which spun-off from the same parent program. In some instances, one or more child program 120c, 120cc may be spun-off from the program. In one example, a spin-off 110c may be one generation removed from a parent program 100. A spin-off 120c of the spin-off 110 may be two generations removed from the parent. Any number of generations of spinoffs may be created from a parent program. A spin-off program may have any number of generations of ancestors. For example, a program 130c may be three generations removed from an original program 100. In some instances, spin-off programs may be traced back to a single originating program. Alternatively, multiple programs may be combined to create spin-off programs. In some instances, an originating program may be provided and code from a second program may be copy and pasted into the originating program to create a spin-off program. The spin-off program's parent program may still be the originating program (e.g., the program the user has selected and is viewing when the user selects an option to save as a spin-off program).

When a spin-off program is created, the records relating to the spin-off program may include an indication of the parent program. Thus, the spin-off program may be associated with its parent program. When viewing a spin-off program, the reference to the parent program may be displayed. The records of the parent program may be updated to include the spin-off program. One or more spin-offs of the parent program may be associated with the parent program. The currently created spin-off program may also be added to the list of spin-offs for the parent program. When viewing the parent program, the user may be able to view the spin-off programs associated with the parent program. Thus, when a new spin-off program is created, the relationship between the spin-off program and its parent program may be stored in memory. Records for the spin-off program and the parent program may be updated to include an indicator of the relationship.

In some instances, programs and related spin-offs may be accessible via an online community. The programs accessible via the online community may be community programs. The relationships between community programs may be traceable via a user interface of the online programming community. For example, when a user is viewing a selected program, the user may select an option to view one or more spin-offs of the program. In some instances, the user may be able to select an option to view a parent of the program.

Figure 2:
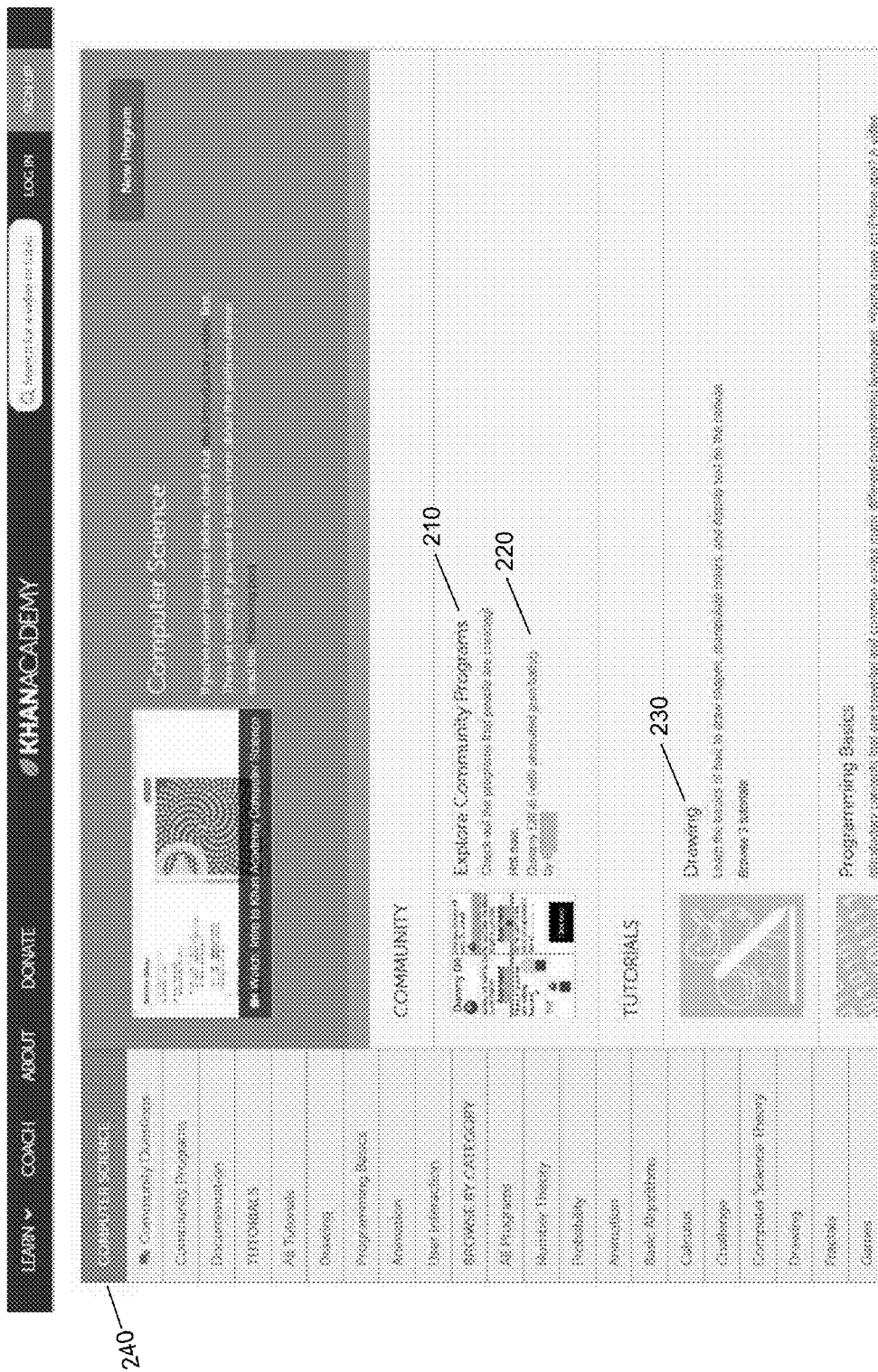
FIG. 2 shows an example of an educational environment through which community programs may be accessed.

FIG. 2 shows an example of an educational environment through which community programs may be accessed. In some instances a landing page of an online community may provide a link or other access feature 210 through which community programs may be accessed. The community programs may be programs that members of a community or individuals accessing the community are creating. In some embodiments, members of a community may be individuals who have an account with the online community. Authentication may or may not be required for the individual to access his or her account. In some instances, individuals may be able to access the community without being a registered member. For example, members of the public may be able to navigate to the community page and view code and/or save spin-offs of programs. Such community programs may include original programs, or spin-offs (e.g., one or more generations removed) of original programs.

In some embodiments, the landing page may show indicators of community programs that are popular or currently undergoing a large amount of activity. For example, a 'hot now' display 220 may provide summary of active community programs.

A landing page may provide additional features. In some instances, educational content may be provided. The educational content may relate to programming. For instance, one or more programming tutorials 230 may be accessible via the landing page. In some instances, code from tutorials may be used to create spin-offs and other community programs.

In some embodiments, a side menu 240 may be provided. The side menu may permit a user to access different pages of the online community. The side menu may permit a user to access community portions, such as community questions, community programs, or documentation. The side menu may permit a user to access one or more tutorial. In some embodiments, a user may be able to browse programs by category. In some instances, the programs that a user may browse by category may include tutorial programs and/or community programs, such as spin-offs.

Figure 3:
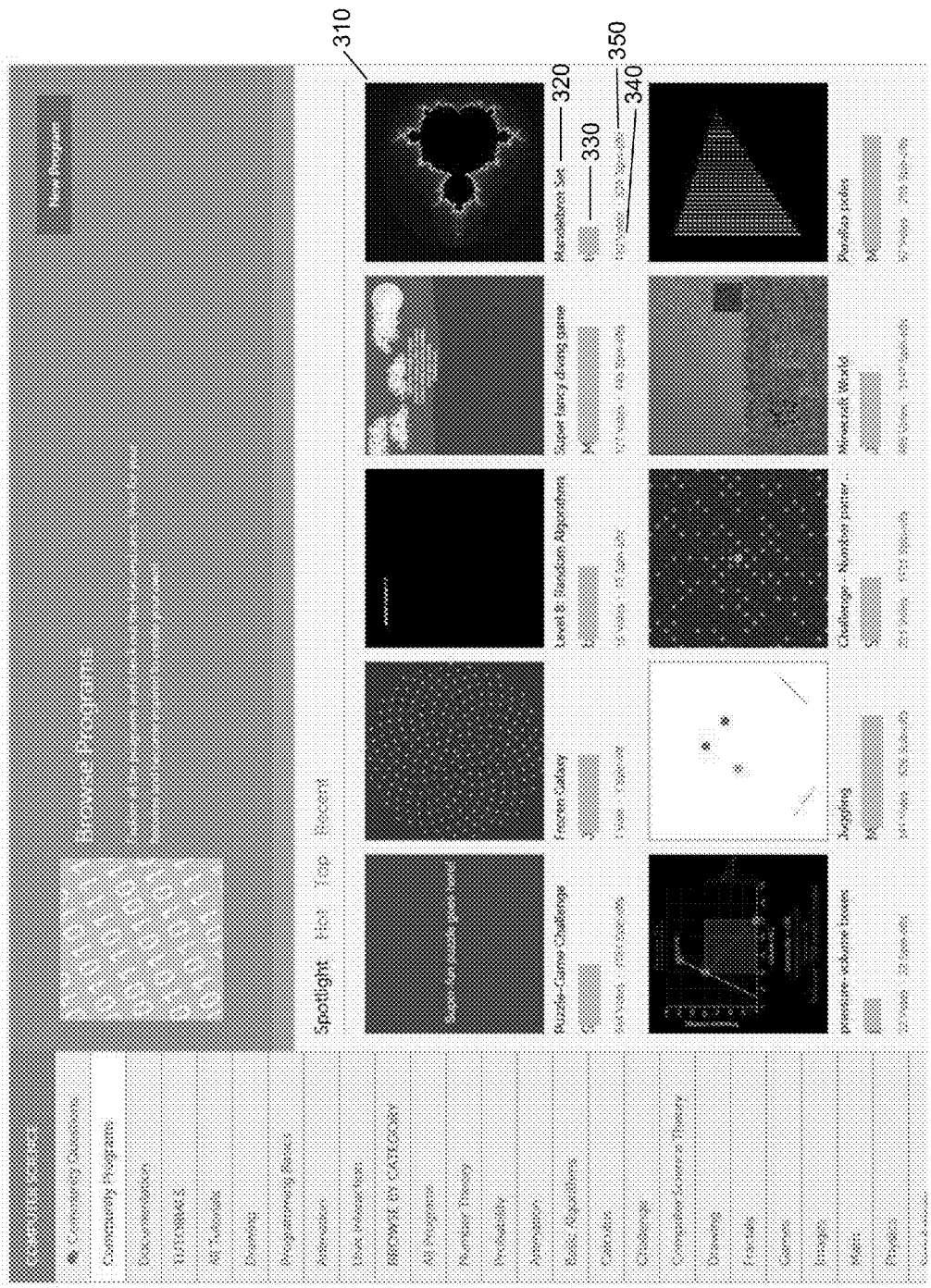
FIG. 3 shows an example of a user interface through which programs that are under the 'spotlight' may be browsed.

FIG. 3 shows an example of a user interface through which community programs that are under the 'spotlight' may be browsed. In some embodiments, the community programs under the 'spotlight' may be selected by online programming community as good programs for teaching and/or learning. In some instances, one or more administrator of the online programming community may make the selection of the 'spotlight' programs. Community programs may be viewed under any designation or order. Examples of designations of community programs may include 'spotlight' programs, 'top' programs, 'hot' programs, or 'recent' programs. Other designations or groupings may be provided. Users may be able to browse existing programs according to designation, or may search for community programs.

An image representative 310 of an output of the program may be shown. In some instances, a program title 320 may be shown. The creator of the program 330 may also be listed.

In some embodiments, users may be able to vote on programs. For example, if a user likes a program, the user may vote for the program. The number of votes 340 for a program may be displayed. The number of votes for a program may be reflective of the number of different individuals that have voted for the program. A voter may or may not need to be a registered member of the community.

A program may be spun-off when one or more user saves the program as a spin-off. The user may have modified the spin-off program from its parent program. The number of spin-offs of a program 350 may be displayed. In some instances, the number of spin-offs may only encompass programs that are a direct spinoff (e.g., direct child, only one generation removed) of the program. In other instances, the number of spin-offs may include additional generations of spin-offs (e.g., grandchildren programs and/or great-grand children of programs).

The programs may be displayed in any visual manner. For example, they may be displayed as one or more row and/or one or more column. In some instances, the programs may be displayed as an array. The programs may be displayed as a list. In some instances, the programs may be displayed as tiles.

Optionally, the programs may be displayed in a ranked order. For example, within a 'spotlight' section, the programs may be ranked according to their usefulness for teaching or learning. The ranks or designations for usefulness may be determined by one or more administrator of the online programming community.

Figure 4:
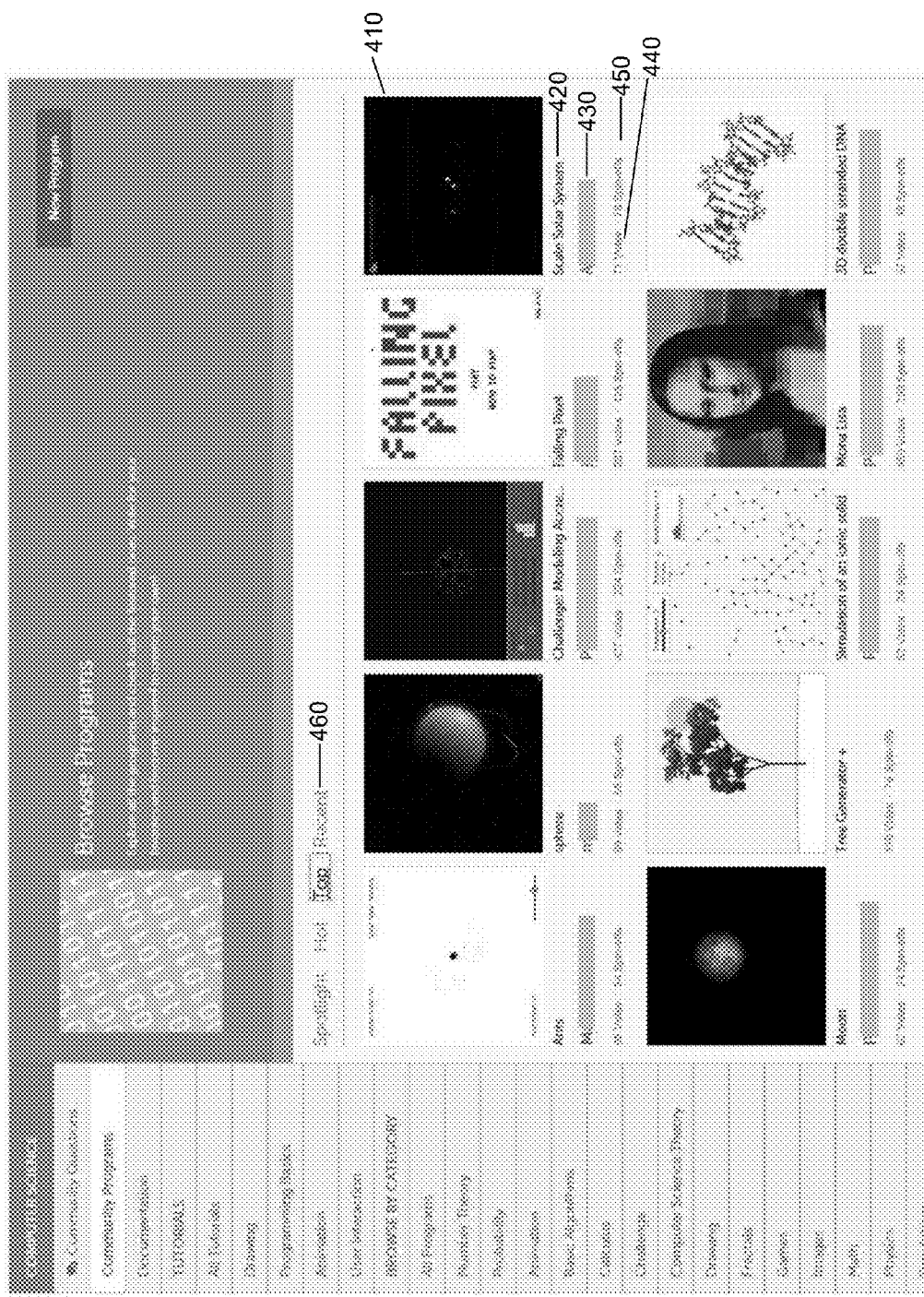
FIG. 4 shows an example of a user interface through which the 'top' programs may be browsed.

FIG. 4 shows an example of a user interface through which the 'top' programs may be browsed. An image representative 410 of an output of the program may be shown. A program title 420 and/or creator of the program 430 may be shown. The number of votes 440 for the program may be displayed. Additionally, the number of spin-offs of a program 450 may be displayed. The programs may be displayed in a ranked order. The order of display may be different from the 'spotlight' section and/or the 'hot' section. In the 'top' section, the programs may be ranked according to the number of votes that the programs have received. Alternatively, an algorithm may be used to surface the highest quality programs based on the number of votes, regardless of the age of the program or votes. This may include a time-independent sorting algorithm that may incorporate additional factors to the total number of votes.

By contrast, in a 'hot' section, the programs may be ranked according to the total number of votes and how long it has been since the program was created. A time dependent sorting algorithm may be used to provide a constant stream of programs balancing newness and quality. Thus, a program is likely to be ranked higher if the program has received a greater number of votes and was created more recently.

In another example, in a 'recent' section, the programs may be ranked according to how recently they were created. In some instances, the programs may be ranked accordingly to how recently they were saved or updated. The more recent programs may be at the top of the ranking.

The user interface may include one or more program listing options 460 through a user may select whether to view community programs under different types of lists (e.g., spotlight, hot, top, or recent). The listing of community programs may be updated to match the user's selection. Other forms of organization of the community programs may be provided. For example, the community programs may be listed according to title name (e.g., alphabetically), creator name (e.g., alphabetically), families (e.g., spin-offs from the same program listed together), number of votes (e.g., highest number of votes listed first), number of spin-offs (e.g., highest number of spin-offs listed first), type of output (e.g., video, figures, text), complexity of program, or length of program.

In some embodiments, a user may be able to search for a program. Optionally, a search field may be provided. A user may search for a program by title, creator name, program family, or any other characteristics.

Figure 5:
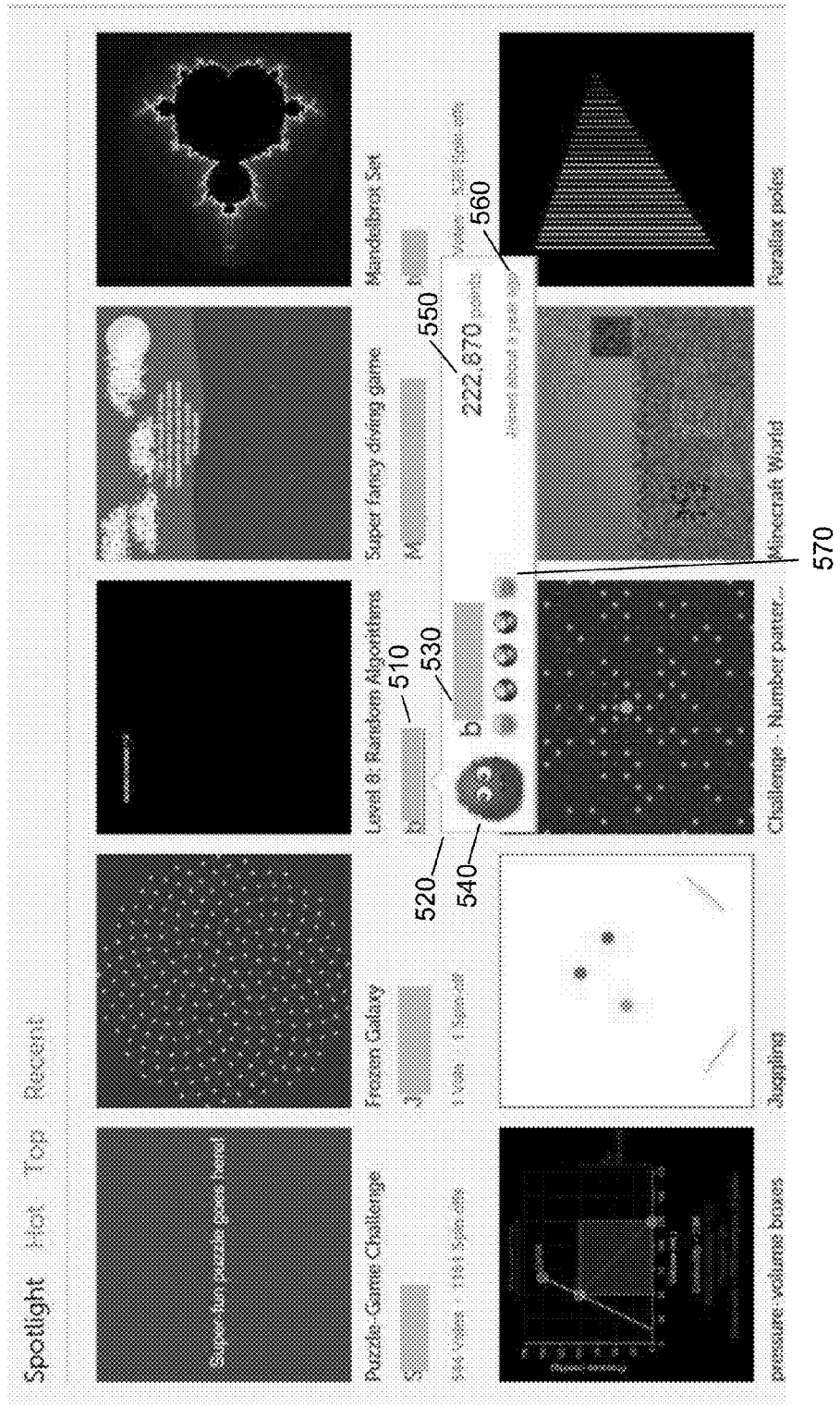
FIG. 5 shows how summary information about a creator of a program may be displayed in accordance with an embodiment of the invention.

FIG. 5 shows how summary information about a creator of a program may be displayed in accordance with an embodiment of the invention. A listing of community programs may include the creator 510 of a program. The creator name displayed may be the creator's username in an online community.

In some instances, additional information about the creator may be displayed. For example, additional information may be displayed as a pop-up or overlay display 520. The additional display may be shown in response to an interaction between a user and the creator name displayed. For example, hovering a pointer over the creator name may cause the other information to be displayed.

The additional information may include the creator name 530 which may be the same as the creator name shown in the community program list. A visual representation 540 of the creator may be displayed. The visual representation of the creator may be an image, such as an avatar or photo of the creator.

The creator's points 550 may be displayed. The points may be earned through activity by the creator. For example, points may be provided based on creating programs, spinning-off code, providing code that is spun-off by others, performing one or more educational program or tutorial, providing comments or helpful tips, submitting questions, receiving votes, participating in the online community over a period of time, or any other activity. The length of time 560 that the creator has been a part of the online community may be displayed. In some instances, the length of time may be the amount of time since the creator has registered with the community or first performed an action in the community.

The additional information may also show awards or prizes 570 that have been collected by the creator. Such awards or prizes may be earned based on actions by the creator. For example, awards or prizes may be provided for creating programs, spinning-off code, providing code that is spun-off by others, performing one or more educational program or tutorial, providing comments or helpful tips, submitting questions, receiving votes, participating in the online community over a period of time, moderating the community of programs by flagging low-quality or inappropriate content, casting votes on others' programs, sharing programs with social media sites (e.g., Facebook, Google+, Twitter, LinkedIn), making a program that works its way to a 'hot' list, making a program that works its way to a 'top' list, making a program that works its way to a 'spotlight' list, or any other activity.

In some embodiments, the social programming environment may permit a user to comment or provide feedback relating to other individual's programs. Voting may be an example of providing feedback to another individual. Participation or activity in the social programming environment may occur by providing points and/or awards for various activities. A user may be able to earn points or awards for various actions. The number of points or awards of a user may be visible to other individuals of the social programming environment.

Figure 6:
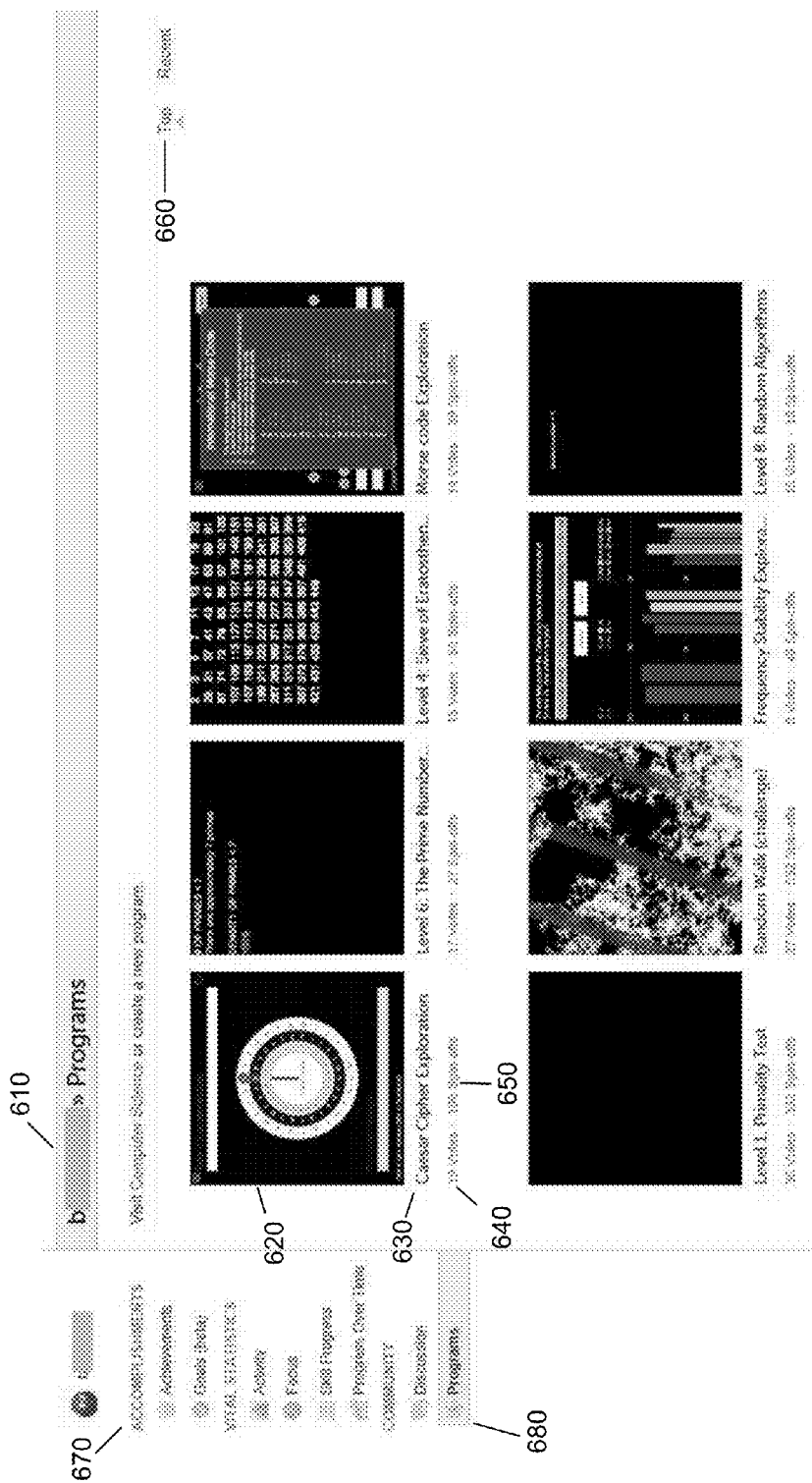
FIG. 6 shows an example of a user interface showing the programs created by a user.

FIG. 6 shows an example of a user interface showing the programs created by a user. In some embodiments, selecting a user name from a program list may cause the various programs created by the selected user to be displayed.

In some instances, the user's name 610 may be displayed. The user's name may indicate the name of the selected user.

The user's programs may be displayed, including an image representative 620 of the program, a program title 630, the number of votes 640 for the program, or the number of spin-offs 650 from the program.

The user interface may show the user's programs displayed in one or more row, one or more column, or an array. The user's programs may be shown as a list or as tiles. The programs may be shown in any order. In some instances, the order may be random. Alternatively the programs may be shown in an order of ranking. For example, the creator's top programs, hottest programs, or most recent programs may be ranked higher. In some embodiments, one or more program listing option 660 may be provided. Through which a viewer can alter the order of program listing. In some embodiments, all of the programs created by the selected user may be shown. This may include original programs and/or spin-off programs. In some implementations, this selected user program view does not include programs from other users.

A side menu 670 may be shown on the user interface. The side menu may include the program creator's user name. The side menu may also show the creator's accomplishments, vital statistics, and information relating to the community. The creator's accomplishments may include achievements and/or goals of the creator. The vital statistics may include the creator's activity, focus, skill progress, and/or progress over time. The community side menu provides access to the creator's discussion and programs. In some embodiments, the portion of the side menu corresponding to the displayed information may be highlighted. For example, if the creator's programs are being displayed, the portion of the side menu relating to the creator's programs may be highlighted 680.

Figure 7:
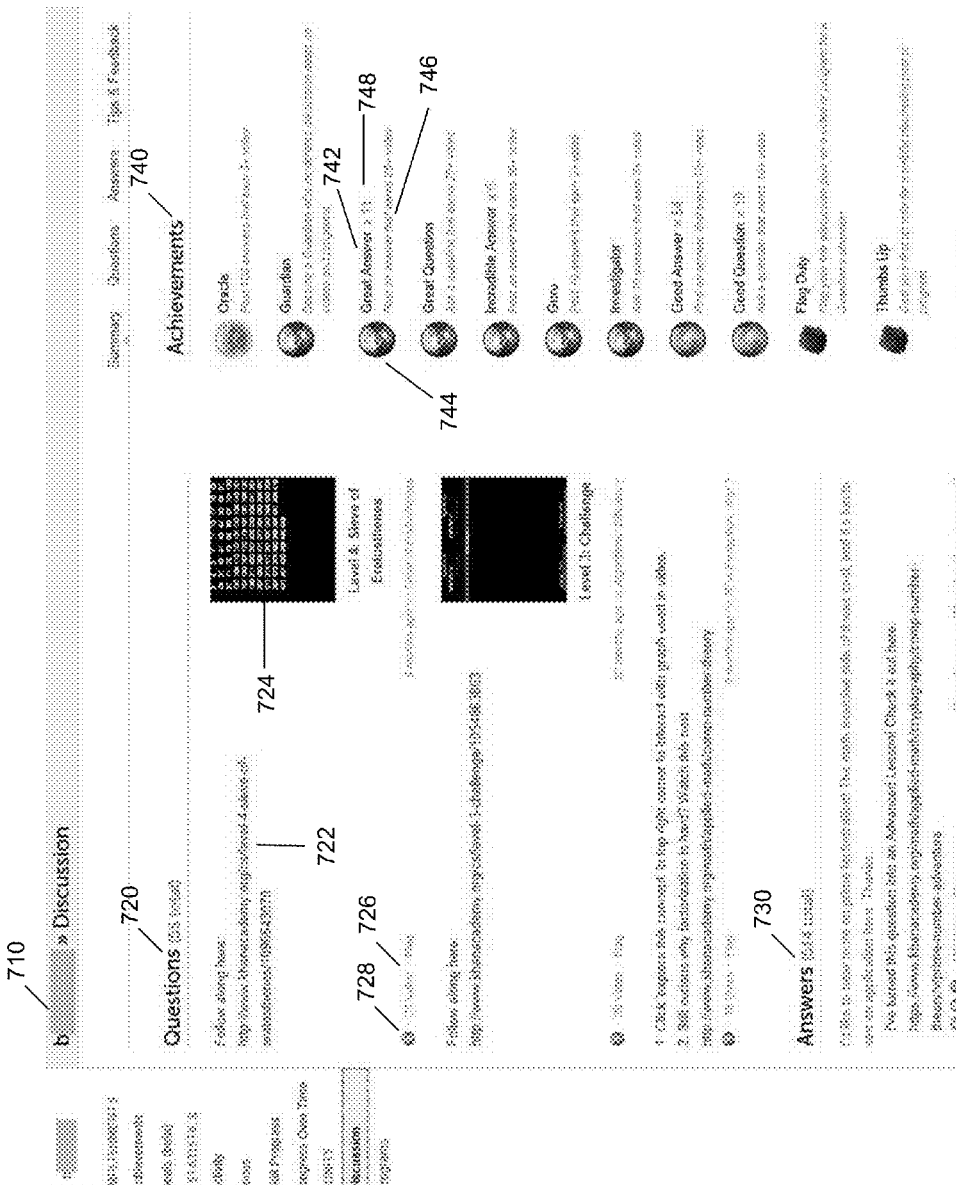
FIG. 7 shows an example of a user interface showing discussion pertaining to a user.

FIG. 7 shows an example of a user interface showing discussion pertaining to a user. The selected user's name 710 may be displayed on the user interface.

One or more questions 720 posed by the user may be shown. In some instances, all the questions posed by the user may be displayed. Alternatively, a selected number of questions posed by the user may be displayed. In some instances, the most recent, or top questions posed may be displayed. In some embodiments, a link 722 may be provided to a discussion thread. A user may select the link to be directed to the direction thread. Information about a program 724 to which the question relates may be shown. For example, an image representative of the program and/or the title of the program may be provided. A user may select the program to view the code and/or code output. A number of votes 726 for the user's question may be displayed. Other users may be able to vote on questions posed. In some embodiments an achievement award 728 relating to the question may be displayed. For example one or more awards may be provided when a user's question receives more than a threshold number of votes.

One or more answers 730 submitted by the user may be displayed in the user interface. Similar to the questions, any number or selected number of answers may be displayed. The answers may be ordered according to any ranking. In some embodiments, a number of votes 732 for the user's answer may be displayed. In some embodiments an achievement award 734 relating to the question may be displayed. For example one or more awards may be provided when a user's question receives more than a threshold number of votes.

A user may interface may also show achievements 740 by the user. The achievements may be shown in any order. For example, they may be shown in reverse chronological order so the most recent achievements are shown first. In other examples, the high level achievements may be shown first. The name of an achievement 742, an image representative of the achievement 744, and/or details about the achievement may be displayed 746. Details about an achievement may include the rule by which to earn the achievement award. For example, a user may earn a Great Question award, when the user asks a question that earned 25 or more votes. In some embodiments, a user may earn multiple of the same achievement award. If multiple achievements have been earned, such number of awards may be displayed 748. Achievement awards and/or a point system may encourage users to participate in the online community. In some embodiments, having achievement awards or point systems may provide the user with special offers or access.

Figure 8:
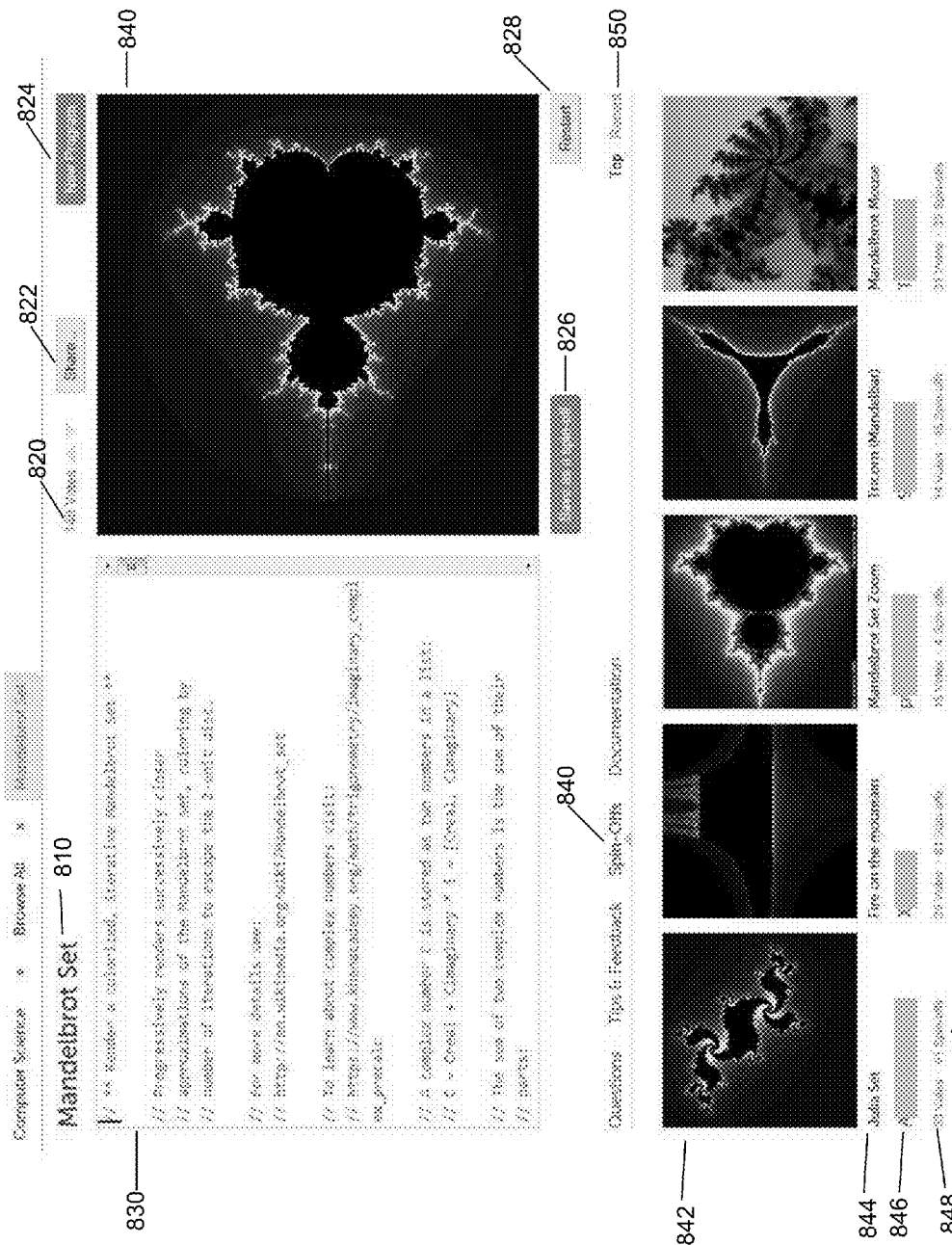
FIG. 8 shows an example of a program and related spin-off programs.

FIG. 8 shows an example of a program and related spin-off programs. A user may select a community program from a plurality of community programs. A selected program title 810 may be displayed. The number of votes 820 received by the program may be displayed. A user may select an option to provide the user's vote. A share option 822 may be presented to a user. The user may share the program with other members of the community, or individuals outside the community. A user may also be presented with an option to create a new program 824. Selecting an option to create a new program may direct a user to a blank new program template.

The user may be presented with a save as spin-off option 826. The option to create a spin-off will save the current displayed code as a spin-off of the user. The user may or may not be the creator of the displayed program. If the user has modified the displayed program from its original state, the spin-off will incorporate the modifications by the user. In some instances, no user other than the creator of the program may be able to save over the existing program with any modifications or updates. In some instances, the creator, or any other user may be able to save a modified program as a spin-off of the existing program. The user who selects the option to save the displayed code as a spin-off may become the creator of the new spin-off program. The new spin-off program will be associated with the user that created it, and may show up in the user's listing of community programs. The pre-existing program's number of spin-offs may be updated to incorporate the new spin-off program.

Code for the selected program may be displayed in a code region 830. An output relating to the code may be displayed in an output region 840. The output relating to the code may show what would be output if the code is compiled and/or executed. The code region and the output region may be adjacent to one another. In some instances, the code region and the output region may be displayed in a side-by-side manner. The code region and the output region reflective of the code region may be displayed simultaneously within the same user interface.

A user viewing the code may be able to modify the code. The code region may be a code editor that may permit a user to interact with the code. The user may type directly into the code region, or provide any other type of input to modify the code within the code region. A slider bar, or other tool may enable a user to scroll through the code. The code may be displayed on a browser or application, and the user may be able to view or modify the code through the browser or application. The output region may be updated to reflect modifications to the code region. In some instances, the output region may be updated in real-time. The output region may be automatically updated without requiring separate input from the user. The modification in the code alone may be sufficient to cause the output region to be automatically updated. As a user is typing into the code region, the output region may be updated to reflect the changes are they are being typed. In another embodiment, the output region may be updated at regular intervals of time (e.g., about every hour, every few minutes, every minute, every half minute, every several seconds, every second, every tenth of a second, every hundredth of a second, every few milliseconds, every millisecond). In some instances, an output region may be updated when an instruction is provided for the code to compile, or a restart 828 option is selected. In some instances, the output region may be updated without requiring the entire code to be compiled and/or executed. In some instances, only modified portions of the code may be recompiled and/or executed. The output may be generated with aid of a processor.

A spin-off section 840 may be provided. The spin-off section may show programs that have spun-off the selected program. The spin-off programs may be direct child spin-offs of the selected program. Alternatively, the spin-off programs may also include spin-offs of spin-offs of the selected program for numbers of generations (e.g., grand children of the program, great-grandchildren of the program). The spin-off programs may be displayed with images representative 842 of the program output, a program title 844, a spin-off program creator 846, a number of votes for the spin-off 848, and a number of spin-offs from the spin-off 849. In some instances, the visual images representative of the program output may be a visual output of the one or more lines of computer code of the spin-off program. In some instances, the visual image representative of the program may be a snapshot or still image of the visual output of the one or more lines of computer code of the spin-off program. If the computer code of the spin-off program is modified, the visual image representative of the program may or may not be updated to reflect the modified computer code.

The spin-off programs may be displayed as one or more row, one or more column, or an array. The spin-off programs may be displayed as a list or tiles. In some embodiments, the spin-off programs may be presented in accordance a ranking. The ranking may be determined based on one or more rule. In some embodiments, a spin-off program listing option 850 may be provided. The option may permit a user to select a rule (e.g., top, recent) under which the programs are displayed.

A user may select a spin-off program. Selecting the spin-off program may direct the user to a page where the spin-off is the selected program and such information about the spin-off program is shown. This may include a listing of spin-offs of the selected spin-off program.

Providing a user with direct, visual access to spin-off programs of a selected program may permit the user to easily navigate between related programs. The user may be able to compare code with modifications and see how the visual output may differ. This may provide an educational experience for the user in an intuitive manner. The user may be able to directly see related programs and the effects of specific modifications of an initial set of computer code. The user may also be presented with various ideas on how to modify code to achieve the desired output.

Figure 9:
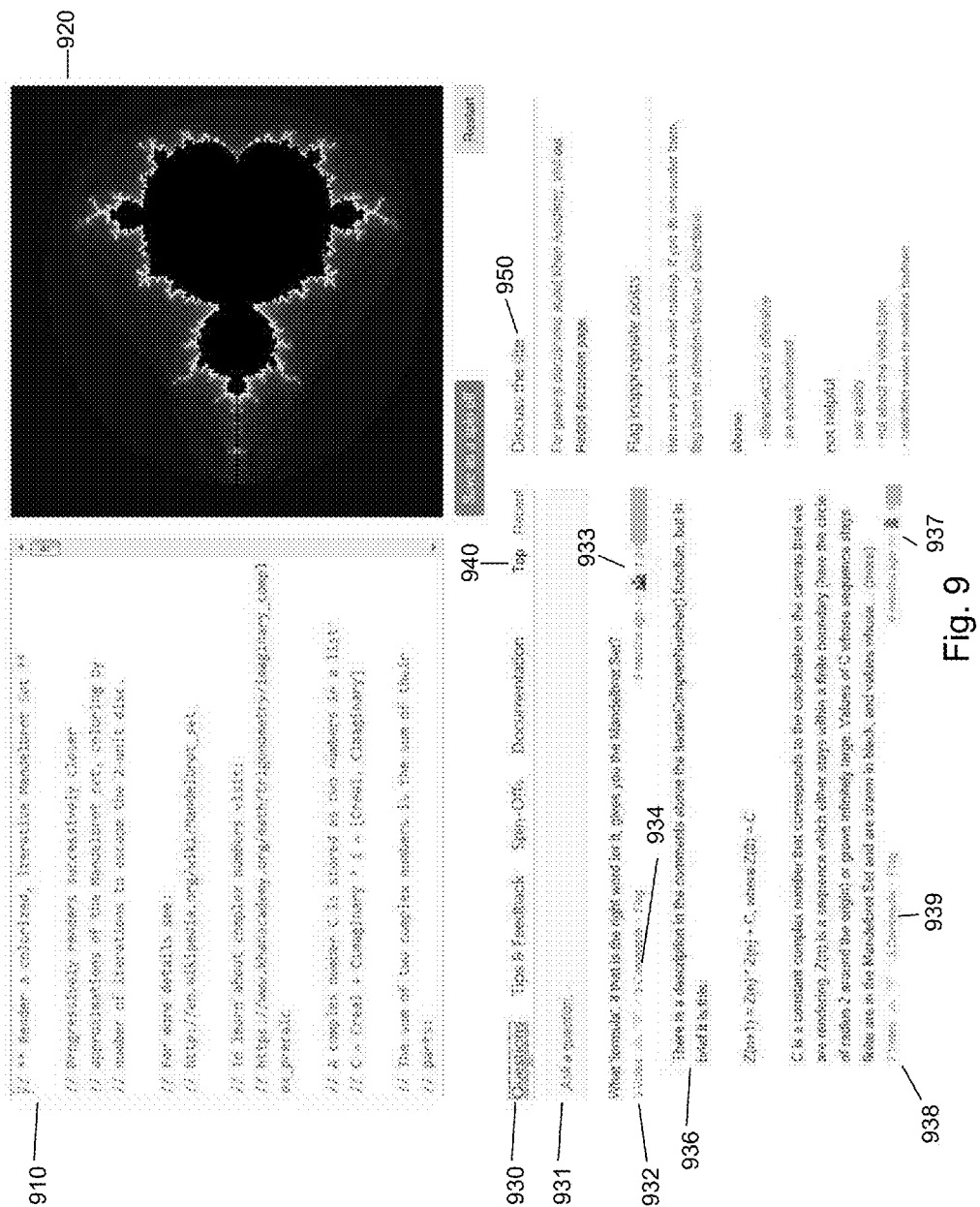
FIG. 9 shows a user interface displaying questions relating to a program.

FIG. 9 shows a user interface displaying questions relating to a program. A code region 910 and an output region 920 for the selected program may be displayed. Rather than viewing the spin-offs for the selected program, a user may select an option to view questions 930 relating to the selected program.

The questions region 930 may show one or more questions that have posed relating to the selected program. Information, such as the number of votes received for the question 932 and the number of comments 934 relating to the question may be displayed. In some embodiments, one or more submitted answers 936 to the question may be displayed. Corresponding votes 938 and comments 939 relating to the answers may be displayed. In some information, identifying information about the user that submitted the question 933 and/or the user that submitted the answer 937 may be displayed.

In some embodiments, an option may be provided for a user to submit a question 931. For example, a field may be provided into which the user may type the user's question. Submitting the question may cause the new question to appear in the questions area.

The questions may be displayed in any order. For example, the most recent questions may be displayed at the top. In other embodiments, the top questions may be displayed at the top. The questions may be displayed in order according to one or more rule. A question listing option 940 may be provided which may determine the rule that defines the order in which the questions will be listed. In some embodiments, questions that are more likely to be pertinent or helpful may be displayed more prominently.

General information relating to discussions 950 may be displayed in a region of the user interface.

Providing a section where questions and answers can be posted for the selected program may enable users of the online community to interact with one another and learn about the selected program. A creator of the program may be able to receive feedback or provide information to other users who may have questions about the programs. Thus, the users of the online community may be able to teach one another. Even if multiple users of the online community are all students learning about computer programming, they may be benefit from one another's knowledge.

Figure 10:
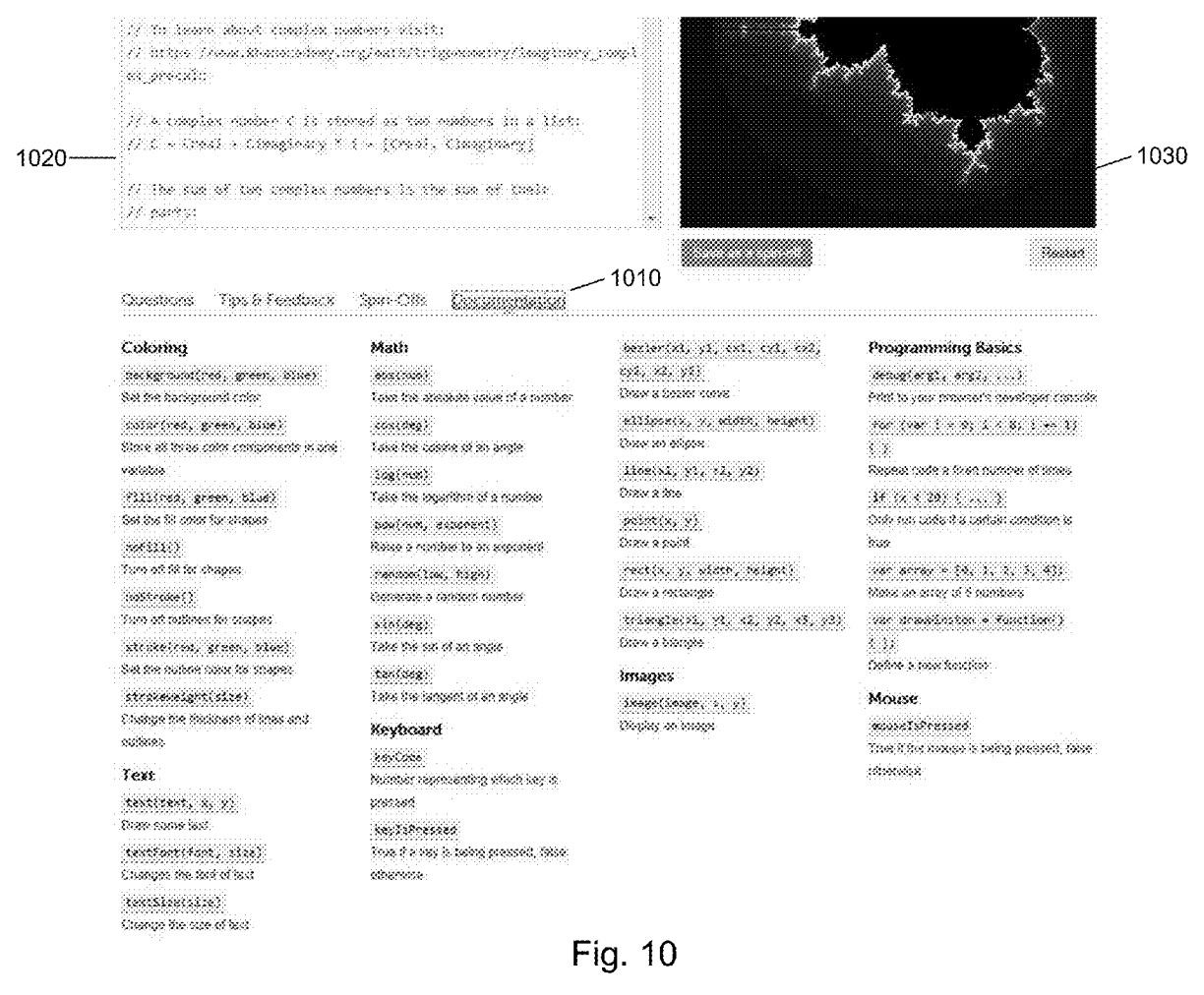

FIG. 10 shows a user interface displaying documentation 1010 relating to a program. A code region 1020 and output region 1030 may also be displayed.

The documentation 1030 may include description of the meaning of various lines of code or functions. In some instances, the lines of code being documented may be provided in the code region 1020. In some instances, the documentation may be formulated automatically with aid of a processor. The processor may determine the code presented in the code region and generate documentation based on the code in the code region. Alternatively, documentation may be created by a user or creator of the code. In some embodiments, documentation may be provided generically without any specificity to the displayed code.

The documentation may be useful for individuals viewing or modifying the code in the code region. The users may be able to view the documentation to understand how some of the lines of code operate, or to get ideas of code that the user can modify or add.

Figure 11:
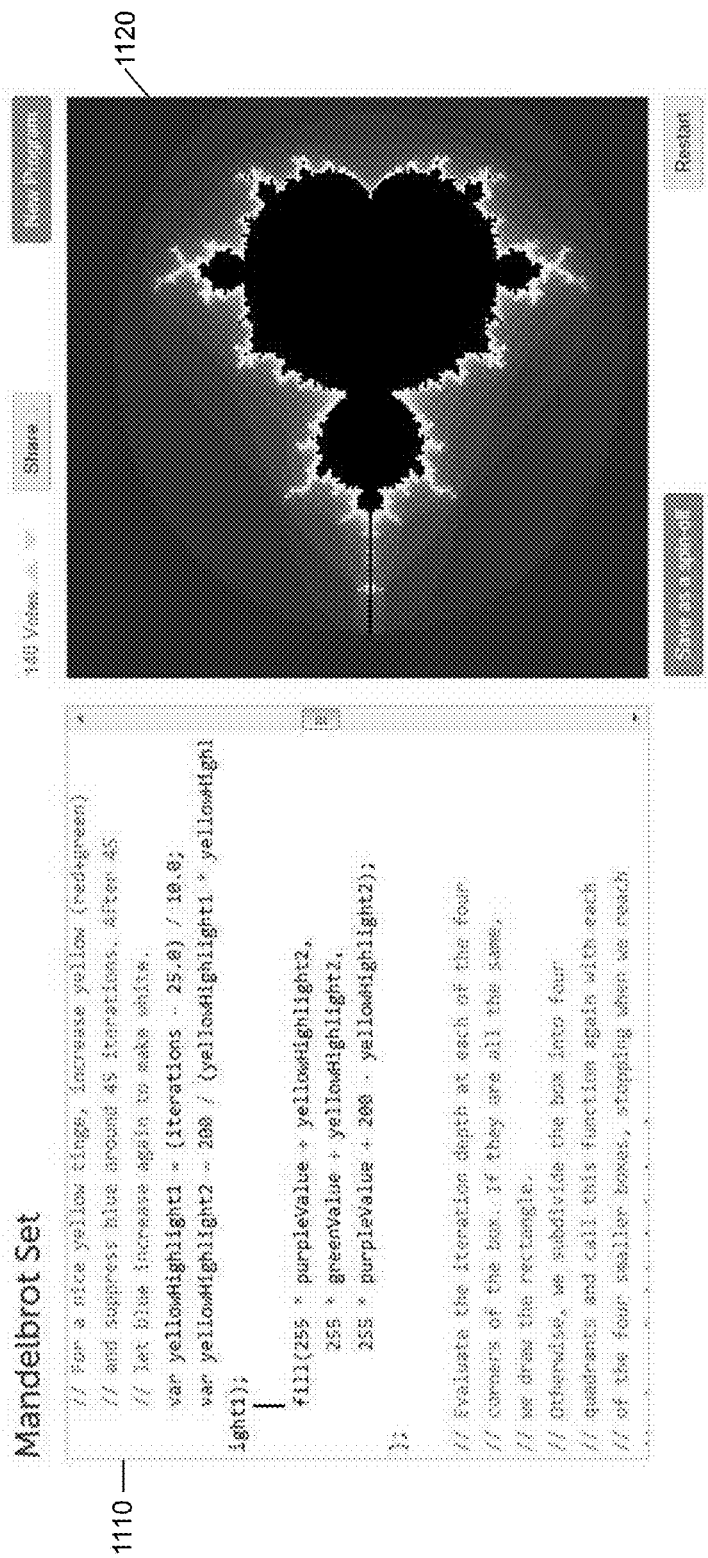
FIG. 11 shows an example of a program with the code and output displayed on the same user interface.

FIG. 11 shows an example of a program with the code and output displayed on the same user interface. The code region 1110 may include one or more lines of code. The output relating to code may be displayed in an output region 1120. One or more lines or snippets of code may be displayed in the code region. Modifications to the code may be reflected in corresponding updates to the output. In some embodiments, the code region may function as a code editor, where a user may view, remove, add, or modify code. The user may be able to highlight to select code. In some instances, the user may be able to copy and paste selected code.

Figure 12:
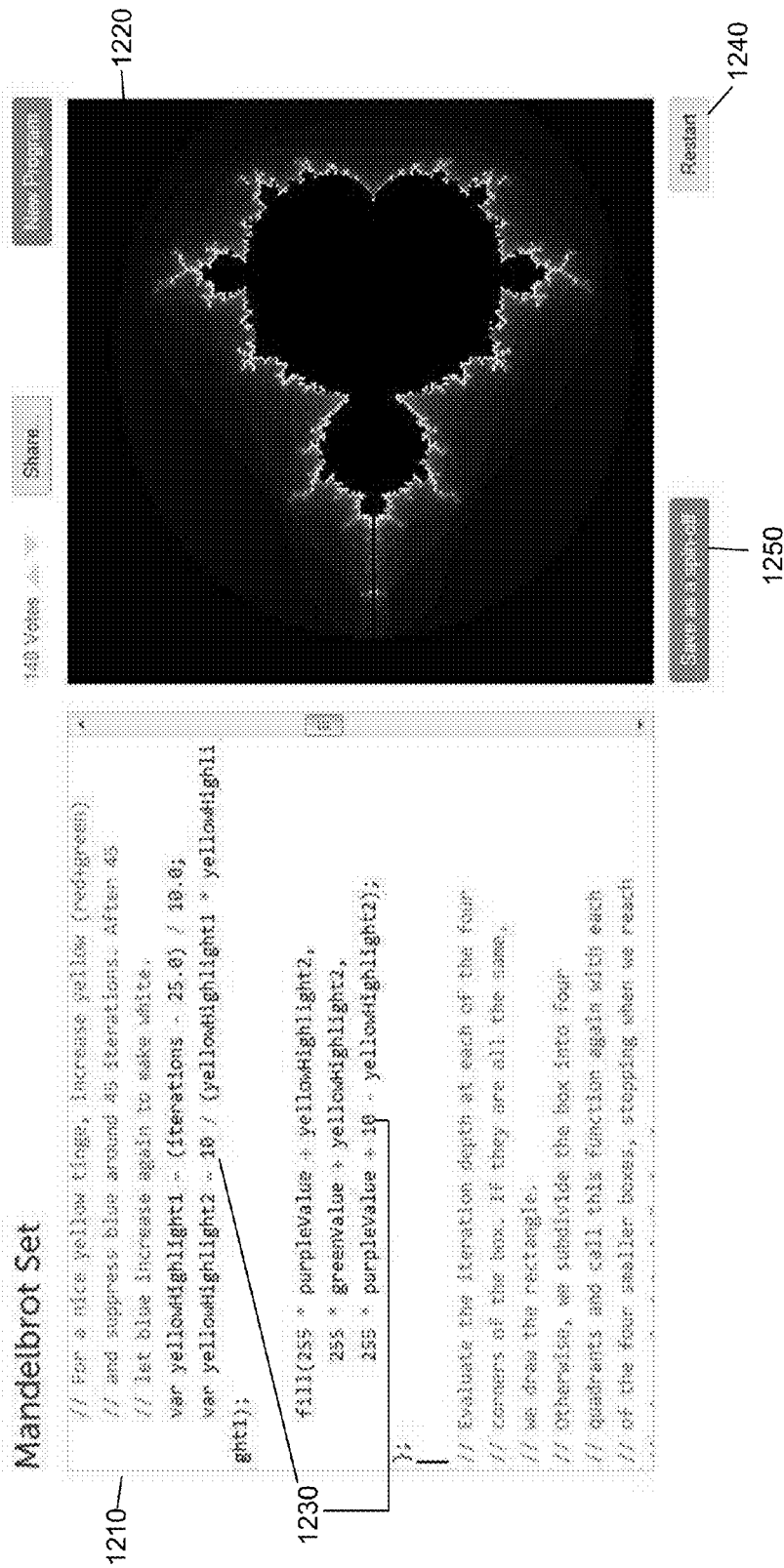
FIG. 12 shows an example where the code for the program has been modified and the displayed output updated to reflect the modified code.

FIG. 12 shows an example where the code for the program has been modified and the displayed output updated to reflect the modified code. The code region 1210 and the output region 1220 may be simultaneously displayed on a user interface. A user may modify code 1230 in the code region. The output region may reflect the updated code change. For example, a change in the coloring of the output may be shown. In some embodiments, the change to the output may be made in real time as the user is typing the modifications to the code. Alternatively, the change to the output may be made at various time intervals, when the code is compiled and/or executed, or when a restart option 1240 is selected.

The modified code may be saved as a spin-off program 1250. In some instances, if the user who modified code is not the creator of the program, the user may only be presented with an option to save the modified code as a spin-off program. The spin-off program may also be saved with the updated output. In some embodiments, descriptions of the spin-off program may include a visual representation of the spin-off program. The visual representation of the spin-off program may include the updated output.

In some embodiments, spin-off programs may undergo no modifications, some slight modifications, or significant amounts of modification. The spin-off program outputs may have similar characteristics to their parent program outputs, or may be drastically different.

Figure 13:
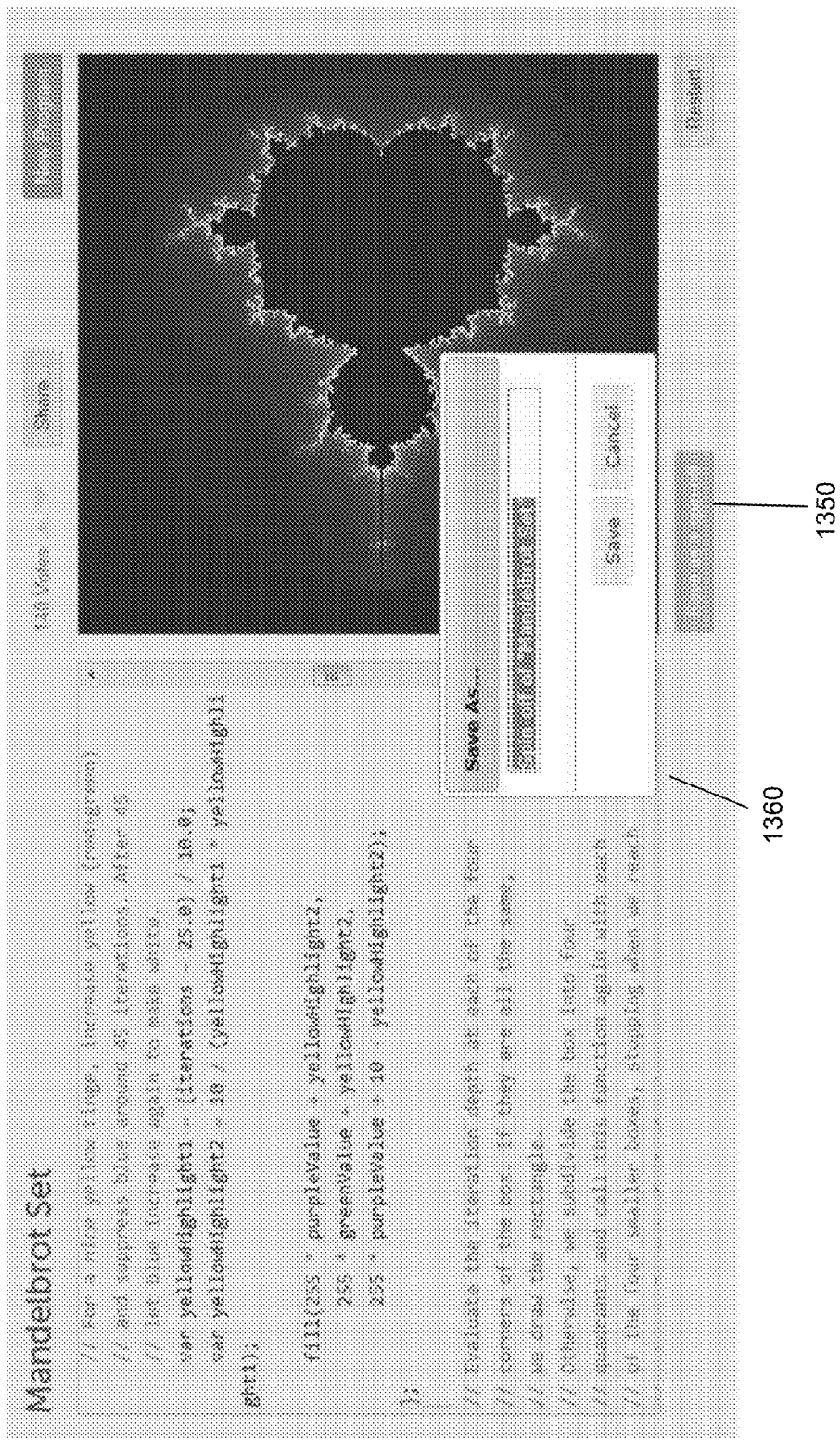
FIG. 13 shows an example of a user interface through which a modified program may be saved as a spin-off

FIG. 13 shows an example of a user interface through which a modified program may be saved as a spin-off. Selecting a save as a spin-off option 1350 may cause a pop-up or overlay display 1360 to be shown. A user may enter a title for the spin-off program. In some instances, a default title may be provided, which may be "Spin-off" of the name of the original program. Once a spin-off program title is created, then a user may select an option to save the spin-off or cancel saving the spin-off.

Figure 14:
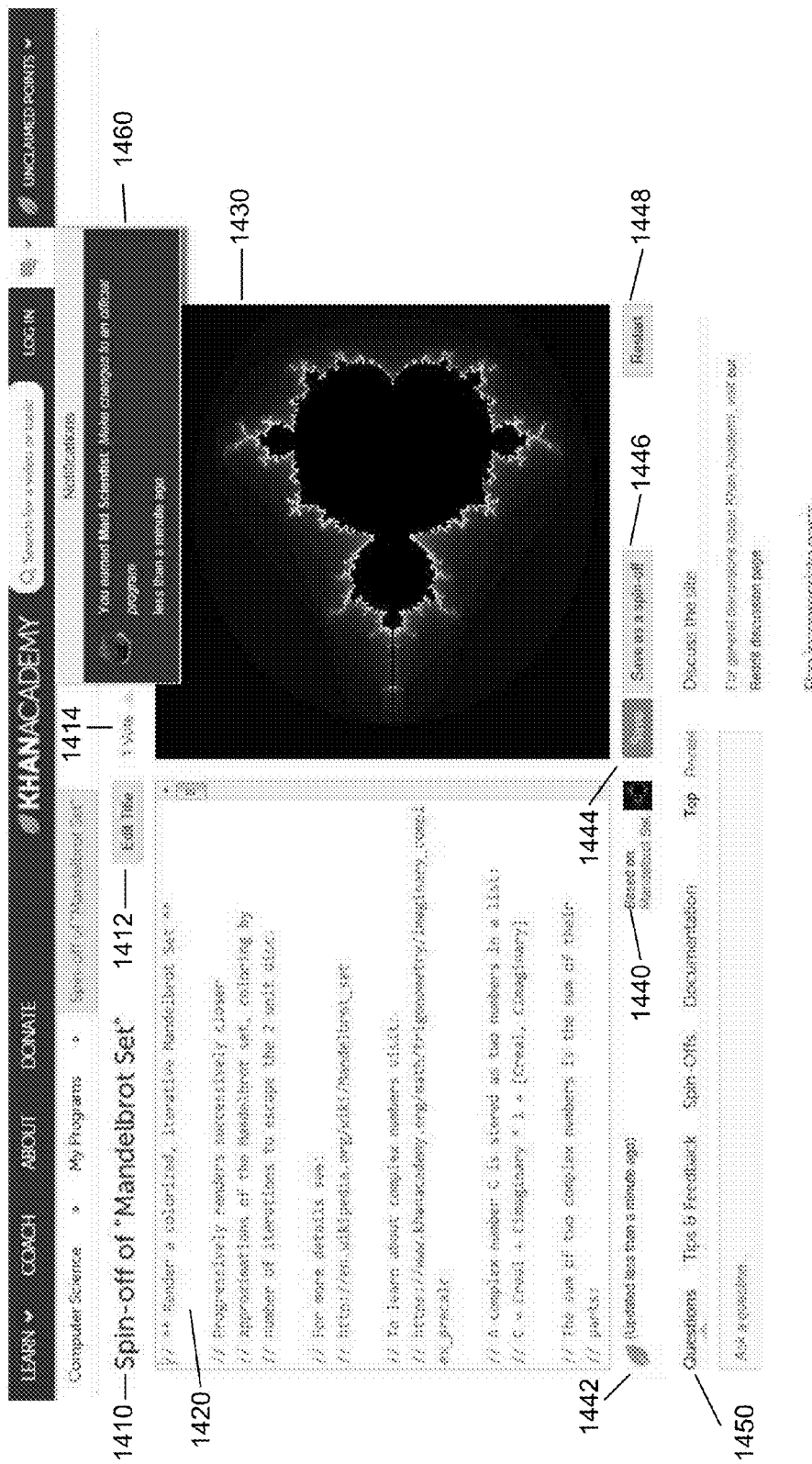
FIG. 14 shows a user interface showing a saved spin-off program in accordance with an embodiment of the invention.

FIG. 14 shows a user interface showing a saved spin-off program in accordance with an embodiment of the invention. Once a spin-off program has been saved, the user interface may be updated to display the saved spin-off program as the selected program.

The title 1410 of the spin-off program may be displayed. An option may be presented to edit 1412 the title. A number of votes 1414 for the spinoff may be displayed.

One or more code region 1420 may be presented, having one or more lines of computer code. An output region 1430 may be displayed, showing an output generated by the computer code in the code region. The code region and the output region may be displayed simultaneously adjacent to one another. The code region and the output region may be visually distinct regions. A viewer of the spin-off program may be able to modify the code in the code region. The output provided in the output region may be updated to reflect the modified code. The output may include text, images and/or animation.

In some embodiments, information about the parent program 1440 to the spin-off program may be presented. For example, the title of the parent program and/or an image representative of the parent program may be displayed. A user may be able to select the information about the parent program to be navigated to the parent program. Thus, a user may easily navigate between related programs. The user may advantageously see the original code for the parent program and compare how the outputs for the parent program and the spin-off program may differ. In some instances, information about the last time the spin-off program was updated 1442 may be displayed.

A save option 1444 may be presented for the program. The user may select the save option to save updates to the code to the spin-off program. In some embodiments, the save program is only presented to a creator of the spin-off program. A save as spin-off option 1446 may also be presented. A user may select an option to save the updates to the code as a new spin-off program. The new spin-off program would be a child program of the current selected spin-off program. The option to save as a new spin-off may be presented to the creator or any other user of the system. This may permit a user to create their own program without having to start from scratch. A user may be advantageously be able to leverage existing code from other users and modify the code to fit the user's purposes. This may permit a user to learn how to program by being exposed to existing code and learning how modify to create desired outputs.

A restart 1448 option may also be displayed. In some embodiments, selecting a restart option may cause the output region to be updated. In some instances, selecting a restart option may cause the code in the code region to be compiled and/or executed.

Additional spin-off program options 1450 may be provided. For example, a user can view questions relating to the spin-off program or enter a new question, can review a tips and feedback section, review spin-offs of the selected spin-off program, or view documentation relating to the spin-off program.

When viewing a spin-off program, a user may be able to track or follow the programming family of the spin-off program. For example, the parent program of the spin-off program may be viewed via information about the parent program 1440. Spinoffs of the selected spin-off program may also be viewed 1450. In one example, as provided in FIG. 1, if the current program being viewed in a spin-off program 110c, information about the parent program 100 may be displayed. Selecting the information about the parent program 1440 may cause the parent program 100 to be the current selected program that is viewed. Alternatively, for the currently viewed spin-off program 110c, the spin-offs 120c, 120cc of the currently viewed program may be shown. The user may select one of the spin-off programs 120c. Selecting the spin-off program 1450 may cause the further spin-off program 120c to be the current selected program that is viewed. When program 120c becomes the currently selected spin-off program, the parent may be shown as program 110c, and the further spin-offs may include 130c. Thus a user may navigate up and down a programming family tree. This may provide a useful tool for viewing how users modify existing programs, and the different types of modifications that occur. Viewing different variations in different spin-offs may provide users with additional ideas on how to modify programs. Thus, users may learn coding techniques and variations from other users of the system.

In some instances, a notifications 1460 display may be provided. The notifications display may provide notifications for the user. The user may be the creator of the spin-off program. The notification display may include alerts that the user has received an achievement award. For example, the user may receive an achievement award for making changes to an official program.

Figure 15:
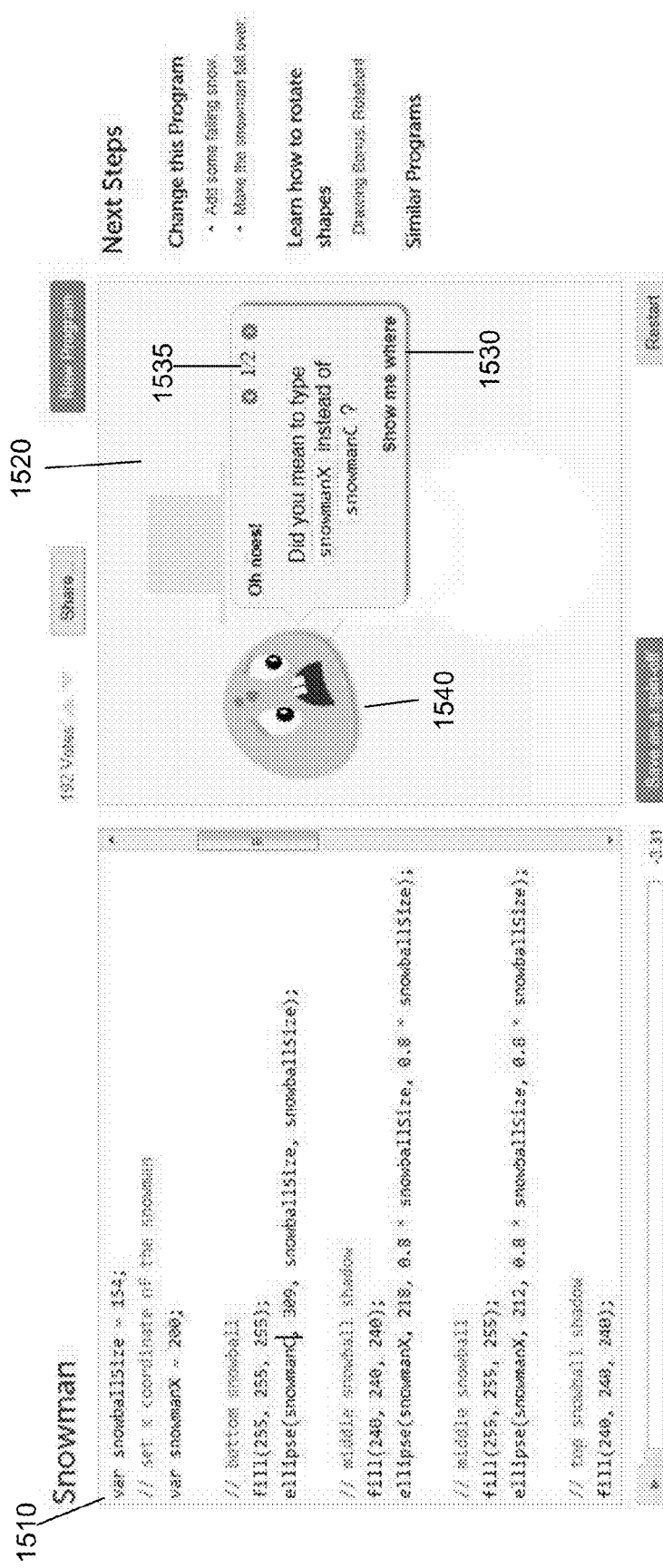
FIG. 15 shows an example of an error message that is displayed in accordance with an embodiment of the invention.

FIG. 15 shows an example of an error message that is displayed in accordance with an embodiment of the invention. A code region 1510 and an output region 1520 may be provided. A user may be able to modify code within the code region. The output region may show an output for the code that is provided within the code region.

In some embodiments, a user may have an error when the user is coding. The output region may be updated to reflect the error. The error may be detected in real-time. The error may be detected while the user is typing or when the user has paused from typing. The error may be detected before the user compiles and/or executes the entire code. The code may be search and/or detected for errors at various time intervals. In some instances, the error may be detected when the code is compiled and/or executed, or part of the code is compiled and/or executed. The error may be detected when the user selects a restart option.

When an error is detected, an error message 1530 may be displayed in the output region. The error message may have suggestions for how to correct the error. In some embodiments, a memory may contain information about common errors and possible fixes that go with the error. A processor may be able to find a relevant error and look up the possible suggestions to fix the error. The memory about the errors may be collected over time and may be based on a historical database. In some instances, the error suggestion information may be entered by one or more individual, such as an administrator of an online community. In some embodiments, multiple options or messages relating to the error may be generated. A navigation feature may enable a user to navigate between the multiple options or messages. Thus, programmers may receive suggestions on how to correct code, thus guiding even novice programmers to fix any detected bugs.

In some instances an error guide 1540 may be used to convey the error message. The error guide may include a visual representation of a character that may provide error messages and/or suggestions on how to fix the error. This may aid in guiding a user to fix errors and improve computer coding skills. The error guide may be part of educational process or system that may permit a user to organically learn how to program. The educational system may make use of immediate visual feedback on devices to help the user understand how the user input in the form of code affects the output.

Figure 16:
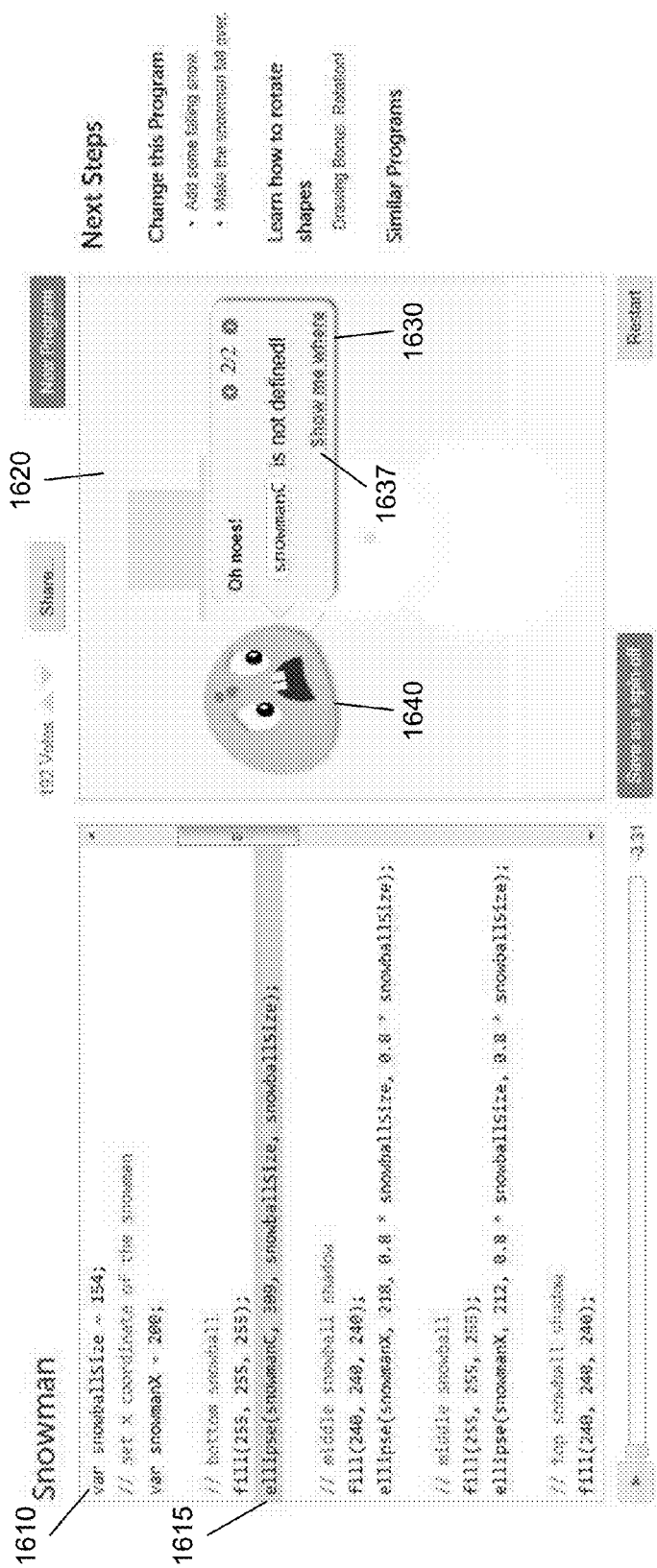
FIG. 16 shows an example of an error tracking feature in accordance with an embodiment of the invention.

FIG. 16 shows an example of an error tracking feature in accordance with an embodiment of the invention. When viewing an error message and/or suggestion to fix the error 1630 the user may select an option to see where the error has occurred 1637.

This may cause a corresponding portion of the code region 1610 to be highlighted 1615. In some embodiments, the entire row or line of code where the error was detected may be highlighted. In some embodiments, just a word or letter where the error has been detected may be highlighted.

In some embodiments, multiple errors may be detected. Multiple portions of the code region may be highlighted simultaneously. Alternatively, only the portion of the code region corresponding to the error message that is currently being displayed may be highlighted. The user may toggle to another error message or suggestion and select a 'show me where' option. This may cause the highlighted portion of the code region to change to match the selected error message. A user may be able to step through the lines of code where one or more errors are detected.

A side by side display may be provided, simultaneously showing an error message and the code causing the generation of the error message. The code may be shown in a first region that is adjacent to a second region, within which the error message lies. As the user alters the code, the error message may be removed or may be updated. For example, the user may view the error message and correct the code in accordance with the suggestion presented. The error message may disappear, or acknowledgement of the correction may be made.

A visual error guide 1640 may be provided, and conveying the error message. In some embodiments, the visual guide and the error message may be within an output region 1620. The visual guide and error message may overlay an output that was provided prior to the detection of the error. For example, if the output was an image of a snowman, the error message may lie over the image of the snowman. In some instances, the image of the snowman may be faded into the background.

A side by side display may be provided of a code and an output to the code, which may include an error message and/or suggestion to fix the detected error as part of the output to the code. Changes to code in the code region may be reflected in real time in the output region, which may show the output to the code and/or error message accordingly. A user may be able to scroll through code in the code region while the output and/or error message is displayed in the adjacent region. Thus, a user may be able to simultaneously view the output and/or error message while scrolling through the code.

Error suggestions may be useful when a user is learning how to program. A user may try experimenting with code, and may receive rapid feedback when the user is making a mistake, rather than having to spend a large amount of time debugging and figuring out the problem, which can be frustrating for novice programmers. This may be applicable in the social programming environment, where the user may be creating spin-off programs, and may try to add or combine features that may cause an error.

Figure 17:
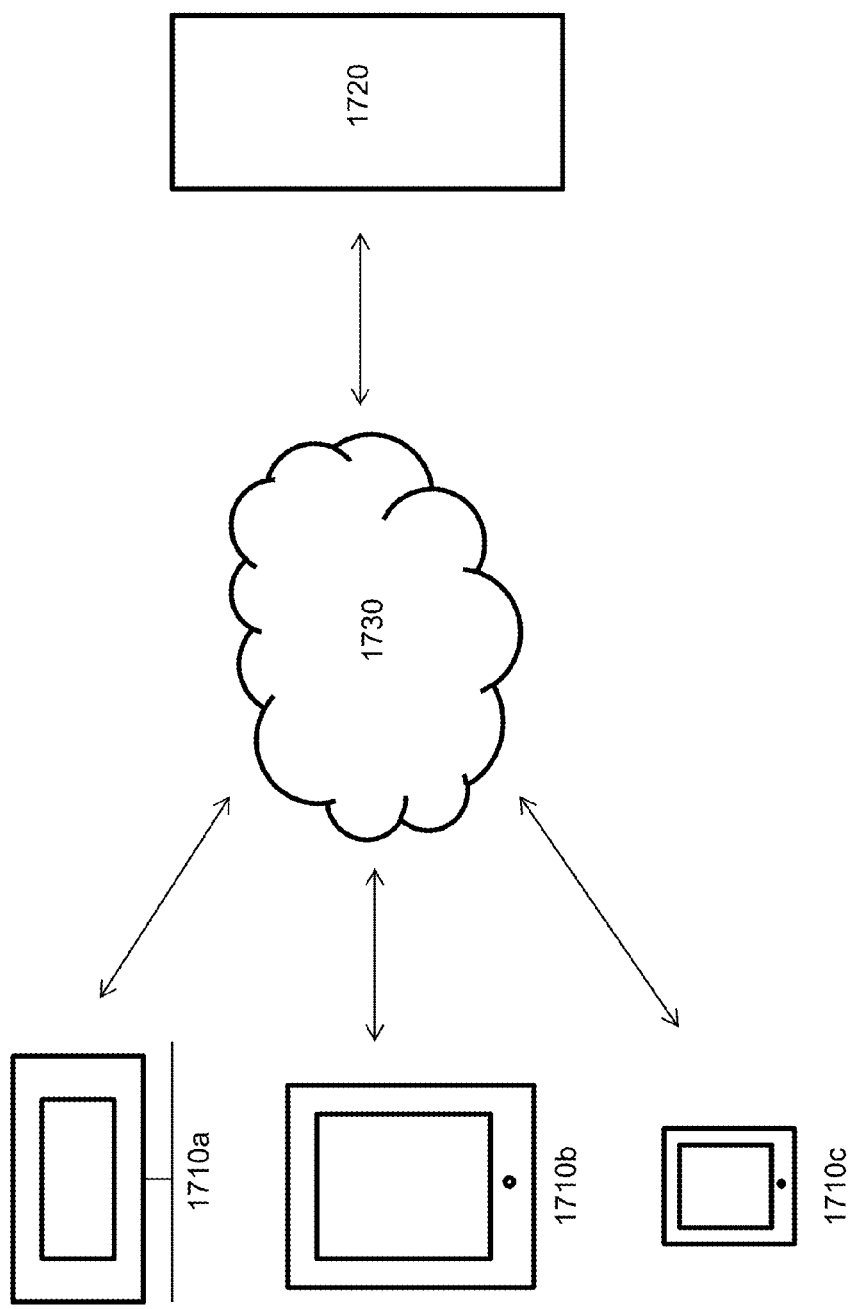
FIG. 17 shows a system for a programming community in accordance with an embodiment of the invention.

FIG. 17 shows a system for a programming community in accordance with an embodiment of the invention.

One or more devices 1710a, 1710b, 1710c may be in communication with one or more servers 1720 of the programming community system over a network 1730.

One or more user may be capable of interacting with the system via a device 1710a, 1710b, 1710c. In some embodiments, the user may be a programmer or an individual who views, creates, or modifies code. The user may be a student or individual learning programming through the online community. The user may be an educator. The user may be an educator teaching one or more individuals how to program through the online community. The user may be an administrator of the online community. The user may create one or more community programs. The user may view or modify one or more community programs. The user may save spin-offs of community programs.

The device may be a computer 1710a, server, laptop, or mobile device (e.g., tablet 1710c, smartphone 1710b, cell phone, personal digital assistant) or any other type of device. The device may be a networked device. Any combination of devices may communicate within the system. The device may have a memory, processor, and/or display. The memory may be capable of storing persistent and/or transient data. One or more databases may be employed. Those persistent and/or transient data may be stored in the cloud. Non-transitory computer readable media containing code, logic, or instructions for one or more steps described herein may be stored in memory. The processor may be capable of carrying out one or more steps described herein. For example, the processor may be capable of carrying out one or more steps in accordance with the non-transitory computer readable media.

A display may show data and/or permit user interaction. For example, the display may include a screen, such as a touchscreen, through which the user may be able to view content, such as a user interface for an online programming community. The user may be able to view a browser or application on the display. The browser or application may provide access to the online community. The user may be able to view a programming interface via the display. The programming interface may show lines of code and/or an output for the code. The display may be capable of displaying images (e.g., still or video), or text. The device may be capable of providing audio content.

The device may receive user input via any user input device. Examples of user input devices may include, but are not limited to, mouse, keyboard, joystick, trackball, touchpad, touchscreen, microphone, camera, motion sensor, optical sensor, or infrared sensor. User input may be provided via one or more physical object that may be able to sense an input by the user, such as any form of movement or vocalization.

The device 1710a, 1710b, 1710c may be capable of communicating with a server 1720. Any description of a server may apply to one or more servers and/or databases which may store and/or access content and/or analysis of content. The server may be able to store and/or access code for an online programming community. The code may be the code of various community programs, such as those described elsewhere herein. The code may be capable of being displayed in a code region and edited or modified by a user. The server may be able to access user account information for an online community. The code may be executed and/or compiled on the server side. An output for the code may be generated on the server side. The code and/or output may be displayed on device. Optionally, the code and the output may be displayed in a side by side manner on a user interface of the device. Alternatively, the code may be executed and/or compiled, or the output may be generated on the client device side. The one or more servers may include a memory and/or programmable processor.

A plurality of devices may communicate with the one or more servers. Such communications may be serial and/or simultaneous. For examples, many individuals may participate in an online community simultaneously. The individuals may be able to interact with one another and/or one another's code. In some embodiments, a first individual on a first device 1710*a* may modify the code created by a second individual on a second device 1710*b*. The second individual device need not be connected to the server 1720 while the first individual is modifying the code and/or saving the first individual's own spin-off program. The second individual may have created a program that is stored in a memory accessible by the server 1720. The first individual's device 1710*a* may access the memory of the server and may display the second individual's program on the first individual's device. The first individual may modify the program and save it as a spin-off program. The spin-off program may be stored in a memory accessible by the server 1720. The spin-off program may be accessible to other individuals and devices that may access the server.

The server may store information about users of the online community. In some instances, registered members of the online community may have accounts. The account information may be stored in memory accessible by the server. For example, information such as the user's name, contact information (e.g., physical address, email address, telephone number, instant messaging handle), educational information, work information, social information, historical information, related programs, or other information may be stored. The user account information may be linked to programs (e.g., original programs, spin-off programs) that have been created by the user.

The programmable processor of the server may execute one or more steps as provided therein. Any actions or steps described herein may be performed with the aid of a programmable processor. Human intervention may not be required in automated steps. The programmable processor may be useful for analyzing code and/or generating an output. The server may also include memory comprising non-transitory computer readable media with code, logic, instructions for executing one or more of the steps provided herein. For example, the server(s) may be utilized to permit a user to enter or generate code and provide a corresponding output. The server may permit a user to modify existing code and create new spin-off programs. The server may analyze the code and determine whether an error would occur and/or provide suggestions to correct perceived errors. Analysis may occur with aid of the processor. The code and/or errors/suggestions may be stored in memory (e.g., databases or other memory storage units). The server(s) may access such information when permitting a user to enter a programming environment.

The device 1710*a*, 1710*b*, 1710*c* may communicate with the server 1720 via a network 1730, such as a wide area network (e.g., the Internet), a local area network, or telecommunications network (e.g., cellular phone network or data network). Communication may also be intermediated by a third party.

In one example, a user may be interacting with the server via an application or website. For example, a browser may be displayed on the user's device. For example, the user may be viewing a user interface for an online programming community via the user's device. The user may view, alter, or create code via the user's device. The output to the code may be displayed on the user's device video and/or audio display.

Aspects of the systems and methods provided herein, such as the devices 1710*a*, 1710*b*, 1710*c* or the server 1720, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Figure 18:
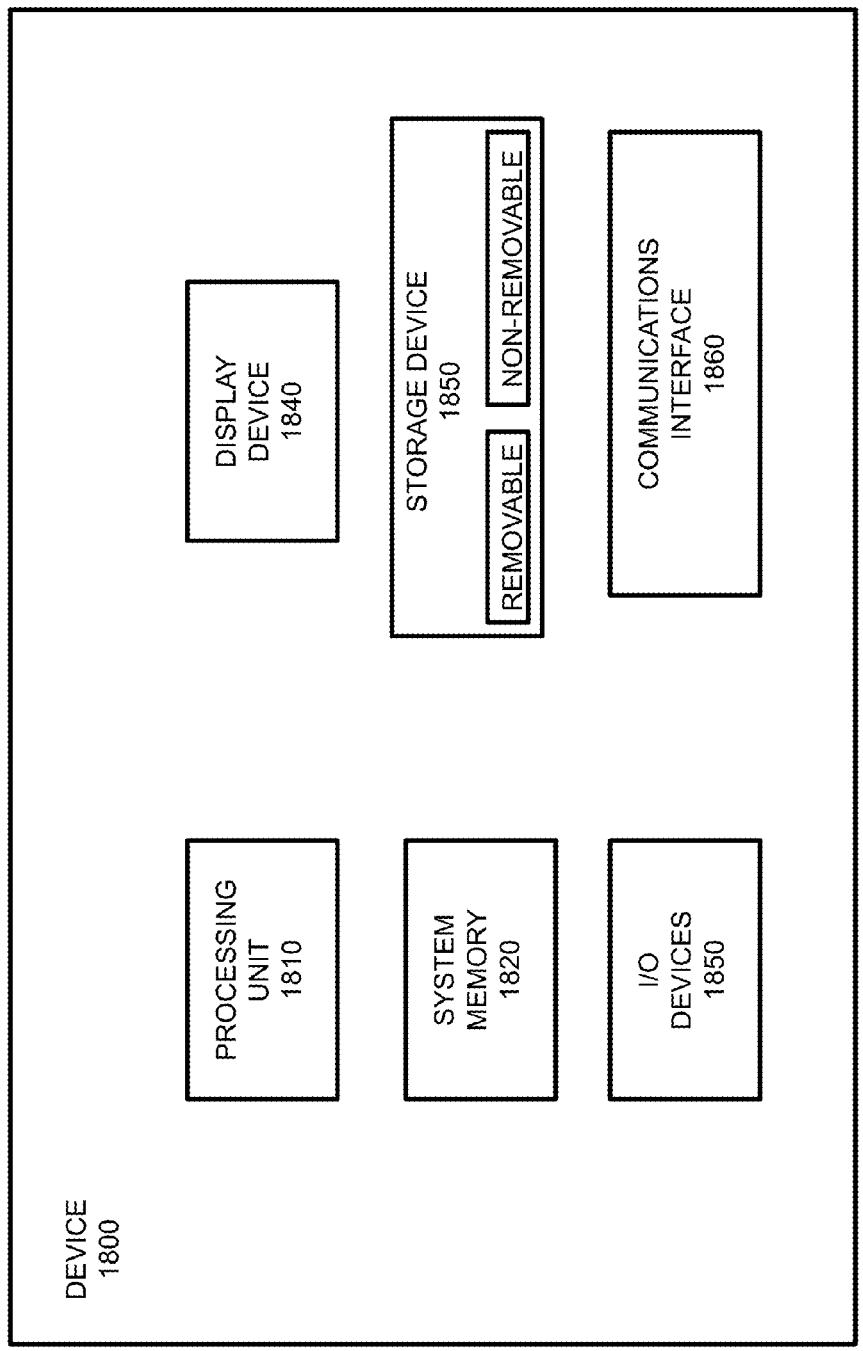
FIG. 18 shows an example of a computing device in accordance with an embodiment of the invention.

FIG. 18 shows an example of a computing device 1800 in accordance with an embodiment of the invention. The device may have one or more processing unit 1810 capable of executing one or more step described herein. The processing unit may be a programmable processor. The processor may execute computer readable instructions. A system memory 1820 may also be provided. A storage device 1850 may also be provided. The system memory and/or storage device may store data. In some instances the system memory and/or storage device may store non-transitory computer readable media. A storage device may include removable and/or non-removable memory.

An input/output device 1830 may be provided. In one example, a user interactive device, such as those described elsewhere herein may be provided. A user may interact with the device via the input/output device. A user may be able to modify or create code by using the user interactive device.

In some embodiments, the computing device may include a display 1840. The display may include a screen. The screen may or may not be a touch-sensitive screen. In some instances, the display may be a capacitive or resistive touch display, or a head-mountable display. The display may show a user interface, such as a graphical user interface (GUI), such as those described elsewhere herein. A user may be able to view code and/or output to the code through the user interface. The user may be able to view community programs through the display. In some instances the user interface may be a web-based user interface.

A communication interface 1860 may also be provided for a device. For example, a device may communicate with another device. The device may communicate directly with another device or over a network. In some instances, the device may communicate with a server over a network. The communication device may permit the device to communicate with external devices.

The systems and methods described herein may utilize or be combined with aspects, components, characteristics, steps, or features of one or more of the following: U.S. Pat. No. 5,760,788 issued Jun. 2, 1998; U.S. Pat. No. 7,840,956 issued Nov. 23, 2010; U.S. Pat. No. 8,266,594 issued Sep. 11, 2012; U.S. Patent Publication No. 2013/0007700 published Jan. 3, 2013; and U.S. patent application Ser. No. 61/864,791 concurrently filed on Aug. 12, 2013 entitled METHODS AND SYSTEMS FOR LEARNING COMPUTER PROGRAMMING, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A computer implemented method of social programming for an online community, the computer implemented method comprising:
  receiving a selection of an initial computer program having one or more lines of computer code, wherein the initial computer program is accessible to a plurality of users within the online community to create spin-off programs of the initial computer program;
  displaying, on a display of a user device, the one or more lines of computer code of the initial computer program in an editable format;
  receiving, from an input to the user device, a modification to the one or more lines of computer code of the initial computer program;
  displaying, on the display of the user device, the one or more lines of computer code of the initial computer program including the modification to the one or more lines of computer code of the initial computer program in a first region, and a visual output of the one or more lines of computer code of the initial computer program including the modification to the one or more lines of computer code of the initial computer program in a second region, wherein the visual output is updated in real-time without requiring compilation of the computer code;
  receiving, from an input to the user device, an instruction to save the displayed one or more lines of computer code of the initial computer program as a first generation spin-off program of the initial computer program and displaying the first generation spin-off program to the plurality of users within the online community;
  saving the first generation spin-off program in a memory storage unit;
  associating the initial computer program as a parent version of the saved first generation spin-off program in the memory storage unit; and
  updating records in the memory storage unit associated with the initial computer program to include the saved first generation spin-off program as a child version of the initial computer program, wherein the initial computer program and the spin-off programs are shared by the plurality of users within the online community.

2. The computer implemented method of claim 1, further comprising displaying, on the display of the user device, the one or more lines of computer code of the initial computer program in the editable format and a visual representation of the first generation spin-off program, wherein the visual representation of the first generation spin-off program allows the plurality of users within the online community to access the first generation spin-off program.

3. The computer implemented method of claim 1, wherein the one or more lines of computer code of the initial computer program are displayed in the editable format within a browser environment of the user device.

4. The computer implemented method of claim 1, further comprising associating the saved first generation spin-off program with a user providing the input from the user device, in the memory storage unit.

5. The computer implemented method of claim 1, further comprising receiving, from an input to the user device, an instruction to modify the displayed one or more lines of computer code of the initial computer program, prior to receiving the instruction to save the displayed one or more lines of computer code of the initial computer program.

6. The computer implemented method of claim 1, further comprising updating the modification to the one or more lines of computer code of the initial computer program for the saved first generation spin-off program in the memory storage unit and not for the initial computer program in the memory storage unit.

7. The computer implemented method of claim 1, further comprising:
receiving a selection of the saved first generation spin-off program having one or more lines of computer code of the initial computer program;
displaying, on a display of a spin-off user device, the one or more lines of computer code of the initial computer program in an editable format;
receiving, from an input to the spin-off user device, an instruction to save the displayed one or more lines of computer code of the initial computer program as a second generation spin-off program of the saved first generation spin-off program;
saving the second generation spin-off program in the memory storage unit and associating the saved first generation spin-off program as a parent of the second generation spin-off program in the memory storage unit; and
updating records in the memory storage unit associated with the saved first generation spin-off program to include the second generation spin-off program as a child of the saved first generation spin-off program.

8. The computer implemented method of claim 7, further comprising:
associating the initial computer program as a grandparent of the second generation spin-off program in the memory storage unit; and
updating records in the memory storage unit associated with the initial computer program to include the second generation spin-off program as a grandchild of the initial computer program.

9. The computer implemented method of claim 7, wherein the spin-off user device is a different device from the user device.

10. The computer implemented method of claim 7, wherein the spin-off user device is a same device as the user device.

11. The computer implemented method of claim 7, further comprising displaying, on the display of the spin-off user device, a parent link indicating an identity of the first generation spin-off program with the one or more lines of computer code of the initial computer program at the same time on the display of the spin-off user device.

12. The computer implemented method of claim 1, further comprising updating the records in the memory storage unit associated with the initial computer program to increase a number of the spin-off programs of the initial computer program by one.

13. A system for social programming for an online community, the system comprising:
a display on a user device comprising a user interface; and
a computer processor that is programmed to:
(i) receive a selection of an initial computer program having one or more lines of computer code, wherein the initial computer program is accessible to a plurality of users within the online community to create spin-off programs of the initial computer program;
(ii) display, on the display of a user device, the one or more lines of computer code of the initial computer program in an editable format;
(iii) receive, from an input to the user device, a modification to the one or more lines of computer code of the initial computer program;
(iv) display, on the display of the user device, the one or more lines of computer code of the initial computer program including the modification to the one or more lines of computer code of the initial computer program in a first region, and a visual output of the one or more lines of computer code of the initial computer program including the modification to the one or more lines of computer code of the initial computer program in a second region, wherein the visual output is updated in real-time without requiring compilation of the computer code;
(v) receive, from an input to the user device, an instruction to save the displayed one or more lines of computer code of the initial computer program as a first generation spin-off program of the initial computer program and display the first generation spin-off program to the plurality of users within the online community;
(vi) save the first generation spin-off program in a memory storage unit;
(vii) associate the initial computer program as a parent version of the saved first generation spin-off program in the memory storage unit; and
(viii) update records in the memory storage unit associated with the initial computer program to include the saved first generation spin-off program as a child version of the initial computer program, wherein the initial computer program and the spin-off programs are shared by the plurality of users within the online community.

14. The system of claim 13, wherein the computer processor is further programmed to display, on the display of the user device, the one or more lines of computer code of the initial computer program in the editable format and a visual representation of the first generation spin-off program, wherein the visual representation of the first generation spin-off program allows the plurality of users within the online community to access the first generation spin-off program.

15. The system of claim 13, wherein the computer processor is further programmed to display the one or more lines of computer code of the initial computer program in the editable format within a browser environment of the user device.

16. The system of claim 13, wherein the computer processor is further programmed to associate the saved first generation spin-off program with a user providing the input from the user device, in the memory storage unit.

17. The system of claim 13, wherein the computer processor is further programmed to receive, from an input to the user device, an instruction to modify the displayed one or more lines of computer code of the initial computer program, prior to receiving the instruction to save the displayed one or more lines of computer code of the initial computer program.

18. The system of claim 13, wherein the computer processor is further programmed to update the modification to the one or more lines of computer code of the initial computer program for the saved first generation spin-off program in the memory storage unit and not for the initial computer program in the memory storage unit.

19. The system of claim 13, wherein the computer processor is further programmed to:
- receive a selection of the saved first generation spin-off program having one or more lines of computer code of the initial computer program;
- display, on a display of a spin-off user device, the one or more lines of computer code of the initial computer program in an editable format;
- receive, from an input to the spin-off user device, an instruction to save the displayed one or more lines of computer code of the initial computer program as a second generation spin-off program of the saved first generation spin-off program;
- save the second generation spin-off program in the memory storage unit and associate the saved first generation spin-off program as a parent of the second generation spin-off program in the memory storage unit; and
- update records in the memory storage unit associated with the saved first generation spin-off program to include the second generation spin-off program as a child of the saved first generation spin-off program.

20. The system of claim 19, wherein the computer processor is further programmed to:
- associate the initial computer program as a grandparent of the second generation spin-off program in the memory storage unit; and
- update records in the memory storage unit associated with the initial computer program to include the second generation spin-off program as a grandchild of the initial computer program.

\* \* \* \* \*